US012712276B2

(12) United States Patent
Funatsu

(10) Patent No.: US 12,712,276 B2
(45) Date of Patent: Aug. 18, 2026

(54) VEHICLE ANTENNA DEVICE

(71) Applicant: AGC Inc., Tokyo (JP)

(72) Inventor: Toshifumi Funatsu, Tokyo (JP)

(73) Assignee: AGC INC., Tokyo (JP)

( * ) Notice: Subject to any disclaimer, the term of this patent is extended or adjusted under 35 U.S.C. 154(b) by 212 days.

(21) Appl. No.: 18/657,962

(22) Filed: May 8, 2024

(65) Prior Publication Data

US 2024/0291154 A1 Aug. 29, 2024

Related U.S. Application Data

(63) Continuation of application No. PCT/JP2022/041507, filed on Nov. 8, 2022.

(30) Foreign Application Priority Data

Nov. 12, 2021 (JP) ................................ 2021-184698

(51) Int. Cl.
*H01Q 1/32* (2006.01)
*H01Q 9/04* (2006.01)

(52) U.S. Cl.
CPC ............. *H01Q 9/0485* (2013.01); *H01Q 1/32* (2013.01)

(58) Field of Classification Search
CPC ...... H01Q 9/0485; H01Q 9/0407; H01Q 1/32; H01Q 1/3275; H01Q 1/1271; H01Q 21/28; H01P 5/02
See application file for complete search history.

(56) References Cited

U.S. PATENT DOCUMENTS 8,576,130 B2 * 11/2013 Dai ........................ H01Q 13/10 343/712
9,837,699 B2 * 12/2017 Dai ........................ H01Q 5/371
11,024,941 B2 6/2021 Funatsu
2008/0055161 A1 * 3/2008 Noro .................... H01Q 9/0407 343/700 MS
2012/0154229 A1 * 6/2012 Kagaya .................. H01Q 13/10 343/713
2018/0090811 A1 * 3/2018 Kagaya .................... H01Q 9/30
(Continued)

FOREIGN PATENT DOCUMENTS

JP S62-57413 U 4/1987
JP H02-94904 A 4/1990
JP H06-40746 A 2/1994
(Continued)

OTHER PUBLICATIONS

International Searching Authority, "International Search Report," issued in connection with International Patent Application No. PCT/JP2022/041507, dated Jan. 24, 2023.
(Continued)

*Primary Examiner* — Awat M Salih
(74) *Attorney, Agent, or Firm* — Foley & Lardner LLP

(57) ABSTRACT

A vehicle antenna device according to the invention includes a dielectric substrate having a first main surface and a second main surface, and a conductive film provided on a side of the second main surface and having an area of 0.025 $m^2$ or more in a plan view of the dielectric substrate. The conductive film has a sheet resistance value of $1.5\times10^3\Omega/\square$ or lower. AM broadcast band are receivable from a feeding point electrically connected to the conductive film.

19 Claims, 9 Drawing Sheets

(56) References Cited

U.S. PATENT DOCUMENTS

| | | | | |
|---|---|---|---|---|
| 2019/0252758 A1* | 8/2019 | Funatsu | .................. | H01Q 1/50 |
| 2020/0023718 A1* | 1/2020 | Funatsu | ................. | H01Q 21/28 |

FOREIGN PATENT DOCUMENTS

| | | |
|---|---|---|
| JP | 2019-140669 A | 8/2019 |
| JP | 2020-022151 A | 2/2020 |
| JP | 2021-072476 A | 5/2021 |

OTHER PUBLICATIONS

International Searching Authority, "Written Opinion," issued in connection with International Patent Application No. PCT/JP2022/041507, dated Jan. 24, 2023.

* cited by examiner

VEHICLE ANTENNA DEVICE

CROSS-REFERENCE TO RELATED APPLICATION

This is a Continuation Application of International Application No. PCT/JP2022/041507, filed on Nov. 8, 2022, which claims priority to Japanese Patent Application No. 2021-184698 filed on Nov. 12, 2021. The contents of the aforementioned applications are incorporated herein by reference.

BACKGROUND OF THE INVENTION

Field of the Invention

The present invention relates to a vehicle antenna device.

Description of Related Art

In recent years, a thermal/optical added value has been given to vehicle openings, particularly to vehicle window glass, such as by coating with a (transparent) conductive film such as a Low-E or a heat-ray reflective film, or by providing a light control film that can electrically (actively) change a visible light transmittance.

On the other hand, when a dielectric such as glass is coated with a conductive film, a desired antenna gain from a glass antenna that receives predetermined broadcast band by disposing a linear conductor pattern on a vehicle window glass such as in a conventional vehicle window glass cannot be obtained. As an example of using a conductive film coating as an antenna, for example, Japanese Unexamined Patent Application, First Publication No. 2019-140669 (hereinafter referred to as "Patent Document 1") is known.

Patent Document 1 describes that a conductive film heated by applying a voltage between a pair of bus bars is provided, and an antenna element including the conductive film functions as an antenna capable of receiving terrestrial digital television broadcast band, digital audio broadcast (DAB) band, and FM broadcast band. Also, in Patent Document 1, the antenna element can also function as an antenna capable of receiving AM broadcast band by providing a lattice portion of a region in which a resistance is increased by removing an area around a conductor portion of the conductive film.

However, as an antenna using such a conductive film, in a case of realizing an antenna that receives AM broadcast band, there is a problem in that the number of man-hours required for processing the conductive film such as, for example, providing the lattice portion increases, and the process becomes complicated.

SUMMARY OF THE INVENTION

The invention provides a vehicle antenna device capable of easily receiving AM broadcast band using a conductive film in a vehicle window glass that uses a conductive film.

A vehicle antenna device according to one aspect of the invention includes a dielectric substrate having a first main surface and a second main surface, and a conductive film provided on a side of the second main surface and having an area of 0.025 $m^2$ or more in a plan view of the dielectric substrate. The conductive film has a sheet resistance value of $1.5\times10^3\Omega/\square$ or lower, and AM broadcast band are receivable from a feeding point electrically connected to the conductive film.

In the vehicle antenna device according to one aspect of the invention, the feeding point may be disposed at a center portion of the conductive film at a distance of 150 mm or more from an end side of the dielectric substrate in a plan view of the dielectric substrate. In the vehicle antenna device according to one aspect of the invention, an outer edge of the conductive film may be substantially quadrangular in a plan view of the dielectric substrate.

In the vehicle antenna device according to one aspect of the invention, the feeding point electrically connected to the conductive film is a first feeding point, and the vehicle antenna device includes an antenna provided on a side of the first main surface and receiving radio waves of at least one of frequencies of a VHF band and a UHF band, an antenna electrode disposed inside an outer edge of a void area provided inside the conductive film in a plan view of the dielectric substrate, an antenna conductor connected to the antenna and disposed on the side of the first main surface, and a filter allowing a signal in a frequency band of radio waves of at least one of frequencies of the VHF band and the UHF band to pass and blocking a signal in a frequency band of AM broadcast band between the conductive film and a ground conductor. The antenna conductor may be electrically connected to the antenna electrode, and radio waves of at least one of frequencies of the VHF band and the UHF band may be receivable by a signal received using the antenna electrode as a second feeding point.

In the vehicle antenna device according to one aspect of the invention, the antenna conductor and the antenna electrode may be electrically connected by capacitive coupling.

In the vehicle antenna device according to one aspect of the invention, the antenna conductor and the antenna electrode may be directly connected by a connection conductor disposed in a through hole of the dielectric substrate.

In the vehicle antenna device according to one aspect of the invention, the dielectric substrate is a first dielectric substrate, and the vehicle antenna device includes a second dielectric substrate disposed on the side of the second main surface of the first dielectric substrate parallel to the second main surface, and an intermediate film disposed between the first dielectric substrate and the second dielectric substrate. The second dielectric substrate may include a third main surface on a side of the first dielectric substrate and a fourth main surface on a side opposite to a side of the third main surface, the conductive film may be disposed between the first dielectric substrate and the second dielectric substrate, and the antenna electrode may be disposed on a side of the fourth main surface.

In the vehicle antenna device according to one aspect of the invention, the conductive film may be disposed in contact with the second main surface.

In the vehicle antenna device according to one aspect of the invention, the intermediate film may include a first intermediate film and a second intermediate film, and the conductive film may be sandwiched between the first intermediate film and the second intermediate film.

In the vehicle antenna device according to one aspect of the invention, the conductive film may be a light control film containing a conductor.

In the vehicle antenna device according to one aspect of the invention, the conductive film may be disposed in contact with the third main surface or the fourth main surface.

In the vehicle antenna device according to one aspect of the invention, the intermediate film may include a first intermediate film and a second intermediate film, the conductive film may include a first conductive film and a second conductive film, the first conductive film and the second conductive film may be disposed at two positions among a position on the second main surface, a position between the first intermediate film and the second intermediate film, a position on the third main surface, and a position on the fourth main surface, and may be disposed in order from a side close to the first dielectric substrate, and the second conductive film may have a second void area disposed to overlap a first void area which is the void area of the first conductive film in a plan view of the first dielectric substrate.

In the vehicle antenna device according to one aspect of the invention, the first conductive film may be disposed in contact with the second main surface, and the second conductive film may be sandwiched between the first intermediate film and the second intermediate film.

In the vehicle antenna device according to one aspect of the invention, the first conductive film may be a conductor for heat ray reflection, and the second conductive film may be a light control film containing a conductor.

In the vehicle antenna device according to one aspect of the invention, the conductive film may include a third conductive film disposed in contact with the fourth main surface, and the third conductive film may be a conductor for a low emissivity film.

In the vehicle antenna device according to one aspect of the invention, the first conductive film may be sandwiched between the first intermediate film and the second intermediate film, and the second conductive film may be disposed in contact with the fourth main surface.

In the vehicle antenna device according to one aspect of the invention, the first conductive film may be a light control film containing a conductor, and the second conductive film may be a conductor for a low emissivity film.

In the vehicle antenna device according to one aspect of the invention, the antenna may be capable of receiving a frequency of FM broadcast band, the vehicle antenna device may include an AM amplifier and an FM amplifier, a signal in a frequency band of AM broadcast band may be input to the AM amplifier from the first feeding point, and a signal in a frequency band of FM broadcast band may be input to the FM amplifier from the second feeding point.

In the vehicle antenna device according to one aspect of the invention, the filter may be a capacitor, and a capacitance of the capacitor may be 5 pF to 150 pF.

In the vehicle antenna device according to one aspect of the invention, the antenna may be disposed to be surrounded by a cover member protruding outward from the side of the first main surface of the dielectric substrate.

In the vehicle antenna device according to one aspect of the invention, the dielectric substrate may be a glass substrate.

In the vehicle antenna device according to one aspect of the invention, the dielectric substrate may be attached to a roof of a vehicle parallel to a horizontal surface of the vehicle.

According to the aspects of the invention, the vehicle antenna device can easily receive AM broadcast band using a conductive film in a vehicle window glass that uses a conductive film.

DETAILED DESCRIPTION OF THE INVENTION

Hereinafter, a vehicle antenna device according to an embodiment of the invention will be described with reference to the drawings.

In the description of the embodiment, the phrase "a side of a first main surface", the phrase "a side of a second main surface", the phrase "a side of a third main surface", and the phrase "a side of a fourth main surface" will be used. The meaning of each of these phrases includes a position on a surface of the main surface or a position away from the main surface in a space facing the main surface. For example, in a relative positional relationship between an optionally selected member A and the main surface, the phrase "the member A is disposed on a side of the main surface" not only means a case in which the member A and the main surface are in direct contact with each other, but also means a case in which the member A is disposed such that the member A is spaced apart from the main surface. Also, in a case in which the main surface and the member A are spaced apart from each other, an inclusion may or may not be between the main surface and the member A.

First Embodiment

Figure 1:
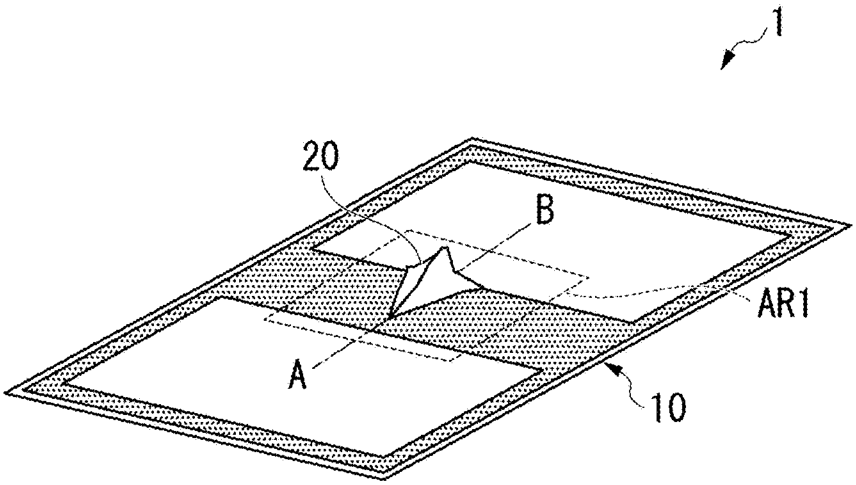
FIG. 1 is a perspective view schematically showing an example of a vehicle antenna device according to a first embodiment.
Figure 2:
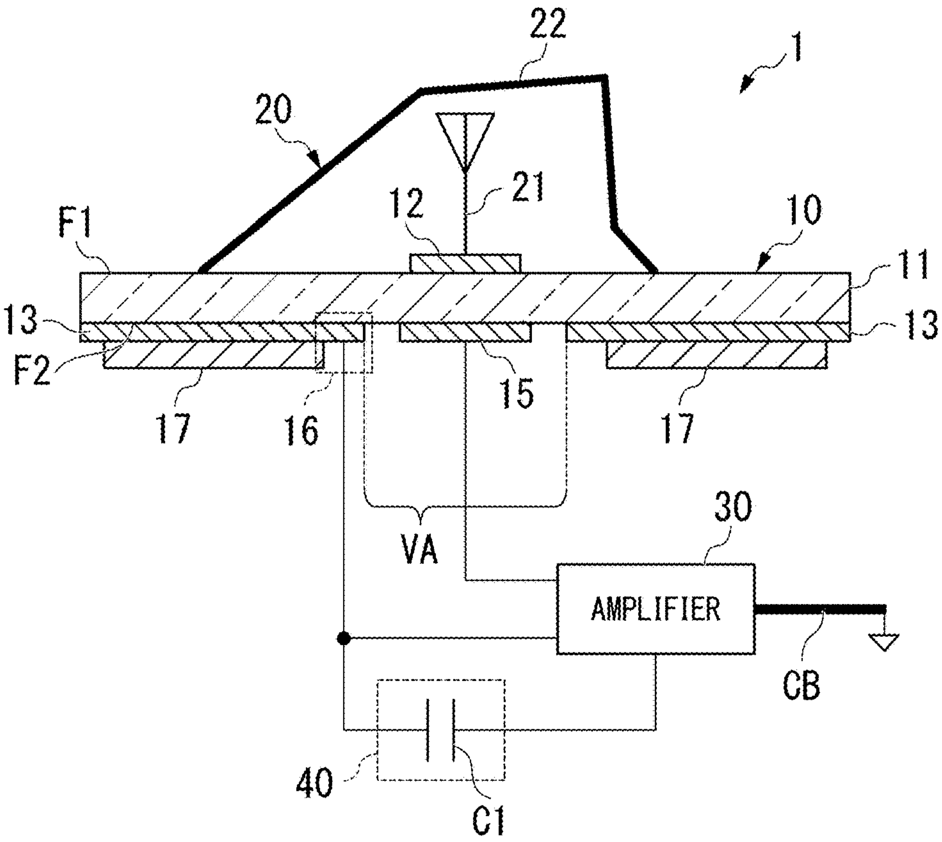
FIG. 2 is a cross-sectional view showing an example of the vehicle antenna device according to the first embodiment.

FIG. 1 is a perspective view schematically showing an example of a vehicle antenna device 1 of a first embodiment. Also, FIG. 2 is a cross-sectional view showing an example of the vehicle antenna device 1 of the present embodiment. Further, the cross-sectional view shown in FIG. 2 is a cross-sectional view along line A-B of an area ARI in FIG. 1.

As shown in FIGS. 1 and 2, the vehicle antenna device 1 uses vehicle glass 10. The vehicle antenna device 1 includes the vehicle glass 10, an antenna portion 20, an amplifier 30, and a filter 40. The filter 40 may be a high pass filter or a band-stop filter. Hereinafter, unless otherwise specified, it will be described as a high pass filter 40.

The vehicle glass 10 is, for example, a roof glass mounted on a roof of a vehicle. The vehicle glass 10 is attached to a roof of the vehicle parallel (including substantially parallel) to a horizontal surface of the vehicle. Here, a configuration example of the vehicle glass 10 will be described with reference to FIG. 2.

As shown in FIG. 2, the vehicle glass 10 is, for example, a single plate glass. The vehicle glass 10 includes a glass substrate 11, an antenna conductor 12, a conductive film 13, an antenna electrode 15, a feeding point 16, and a shielding layer 17.

A shape of the vehicle glass 10 may be a curved shape or a planar shape (non-curved shape). Also, the vehicle glass 10 may have, for example, a single curved shape that is curved in either a vertical direction or a horizontal direction (with respect to one side of a frame) when it is attached to the vehicle. The vehicle glass 10 may have a compound curved shape that is curved in both the vertical direction and the horizontal direction. Further, the single curved shape may be a shape curved only in one arbitrary direction. The compound curved shape may be a shape curved in two or more arbitrary different directions. Further, in a case in which the vehicle glass 10 has a curved shape, a minimum value of a radius of curvature of the vehicle glass 10 is preferably 500 mm or more and 100,000 mm or less.

The glass substrate 11 is an example of a dielectric substrate and has a first main surface F1 and a second main surface F2.

In the present embodiment, a main surface of the glass substrate 11 on an outer side of the vehicle is the first main surface F1. A main surface on a side opposite to the first main surface F1 is the second main surface F2.

The antenna conductor 12 is an electrode connected to the antenna 21 and is disposed on the side of the first main surface F1. The antenna conductor 12 is formed, for example, on the side of the first main surface F1 of the glass substrate 11 to be in contact with the glass substrate 11 (on the glass substrate 11). Here, a configuration example of the antenna conductor 12 will be described with reference to FIGS. 3A to 3C which are plan views of the antenna conductor 12 from outside of the vehicle.

Figure 3A:
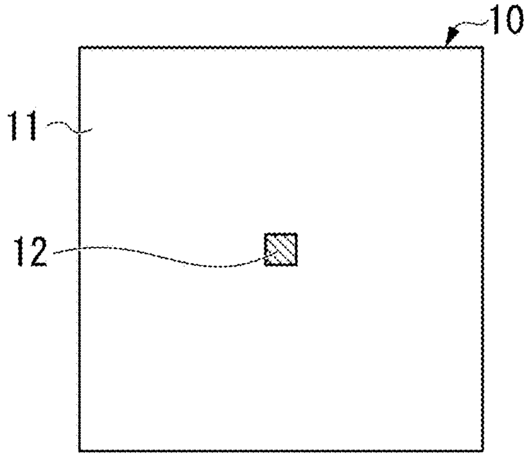
FIG. 3A is a configuration diagram in a plan view showing an example of a vehicle glass according to the first embodiment.
Figure 3B:
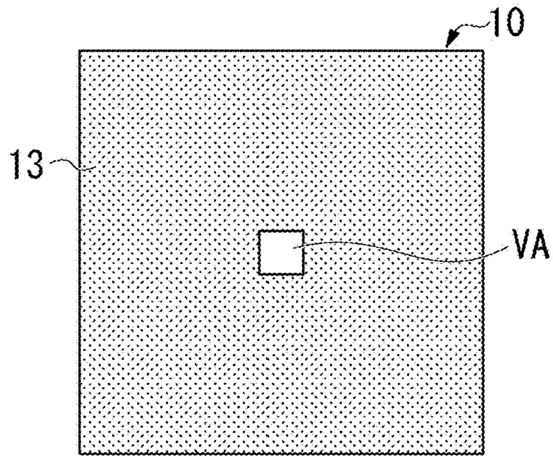
FIG. 3B is a configuration diagram in a plan view showing an example of the vehicle glass according to the first embodiment.
Figure 3C:
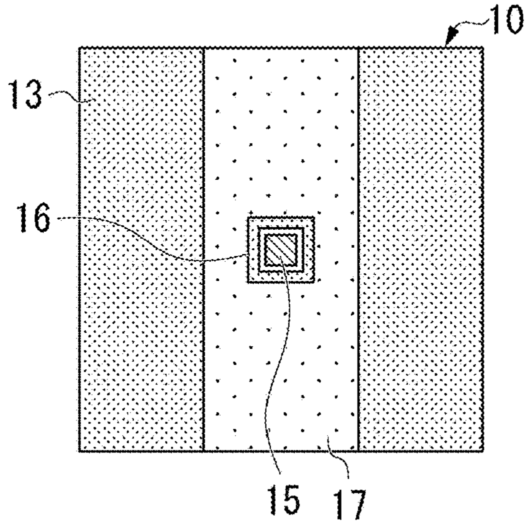
FIG. 3C is a configuration diagram in a plan view showing an example of the vehicle glass according to the first embodiment.

FIGS. 3A to 3C are configuration views in a plan view showing an example of the vehicle glass 10 of the present embodiment. Here, FIG. 3A is a plan view of the vehicle glass 10 from the outside (the first main surface F1) of the vehicle. As shown in FIG. 3A, the antenna conductor 12 is disposed as a square electrode at a center portion of the first main surface F1 of the glass substrate 11. That is, the antenna conductor 12 is formed in a rectangular shape (including a substantially rectangular shape) in a plan view of the glass substrate 11.

Returning to the description of FIG. 2, as the conductive film 13, for example, a conductive film for heat ray reflection (heat ray reflective film) and a conductive film for low emissivity (Low Emissivity (Low-E) coat) that coat the vehicle glass 10 may be exemplified. As the heat ray reflective film, a metal film is typical, and silver (Ag) can be mentioned as the metal film. The low emissivity film such as the Low-E film secures heat insulation by suppressing heat transfer due to radiation. The Low-E film may be a laminated film including, for example, a transparent dielectric film, an infrared reflective film, and a transparent dielectric film in that order. A metal oxide or a metal nitride is typical of the transparent dielectric film, and a zinc oxide or a tin oxide is typical of the metal oxide.

The conductive film 13 is provided on the side of the second main surface F2 with respect to the glass substrate 11. In order for the conductive film 13 to function as an AM antenna that receives AM broadcast band, an area of the glass substrate 11 in a plan view is preferably 0.025 $m^2$ or more, more preferably 0.050 $m^2$ or more, still more preferably 0.100 $m^2$ or more, yet still more preferably 0.250 $m^2$ or more, and particularly preferably 0.500 $m^2$. An outer edge of the conductive film 13 is, for example, substantially quadrangular in a plan view of the glass substrate 11 in accordance with, for example, a shape of the glass substrate 11.

The conductive film 13 functions as an AM antenna and functions as an antenna ground for the antenna 21.

Also, the conductive film 13 preferably has a sheet resistance value of $1.5\times10^3\Omega/\square$ (ohm/square) or lower. The sheet resistance value of the conductive film 13 is more preferably $1.0\times10^3\Omega/\square$ or lower, still more preferably $500\Omega/\square$ or lower, particularly preferably $300\Omega/\square$ or lower, and most preferably $200\Omega/\square$ or lower.

Also, the conductive film 13 has a void area VA therein in a plan view of the glass substrate 11.

The void area VA is disposed not to overlap the antenna conductor 12 and the antenna electrode 15 in a thickness direction of the vehicle glass 10.

Also, as shown in FIG. 3B, the void area VA is disposed as a square void area in a plan view of the glass substrate 11. That is, the void area VA is formed in a rectangular shape (including a substantially rectangular shape) in a plan view of the glass substrate 11.

Returning to the description of FIG. 2, the antenna electrode 15 is disposed on the side of the second main surface F2 inside an outer edge of the void area VA in a plan view of the glass substrate 11, and is electrically connected to the antenna conductor 12. The antenna electrode 15 is disposed in contact with, for example, the second main surface F2 of the glass substrate 11. The antenna electrode 15 and the antenna conductor 12 sandwich the glass substrate 11 therebetween. The antenna electrode 15 is formed on a side opposite to the antenna conductor 12 with respect to the glass substrate 11. In the present embodiment, the antenna conductor 12 and the antenna electrode 15 are disposed to be capacitively coupled.

Further, a distance between the antenna conductor 12 and the antenna electrode 15 is approximately 5 mm. In order for a signal at a frequency in a VHF band or a signal at a frequency in a UHF band to be capacitively coupled, a distance of a dielectric between conductors need only be less than 30 mm, is preferably 20 mm or less, and is more preferably 10 mm or less. As described above, since a thickness of the vehicle glass 10 is typically approximately 2 mm to 5 mm when a laminated glass to be described later is also included, the distance between the antenna conductor 12 and the antenna electrode 15 is sufficient for capacitive coupling. In this way, if the thickness of the vehicle glass 10 is less than 30 mm, capacitive coupling between the antenna conductor 12 and the antenna electrode 15 is possible, and it can be configured as a circuit that amplifies a signal received by the antenna 21 with the amplifier 30.

In FIGS. 2 and 3A to 3C, the shielding layer 17 is disposed on a side of the conductive film 13 opposite to the glass substrate 11. The shielding layer 17 has a void area whose outer edge is disposed outside the outer edge of the void area VA of the conductive film 13. The shielding layer 17 is disposed on the conductive film 13 such that the feeding point 16 is exposed. The shielding layer 17 shields visible light. Further, the shielding layer 17 is an opaque colored ceramic layer. A color of the shielding layer 17 is optionally selected. As the color of the shielding layer 17, a dark color such as black, brown, gray, and navy blue, or white is preferable, and black is more preferable. Further, similarly to the void area VA, the void area of the shielding layer 17 is formed in a rectangular shape (including a substantially rectangular shape) in a plan view of the glass substrate 11.

Further, a disposition of the shielding layer 17 is optionally selected. Also, the shielding layer 17 may not be disposed. Further, in a case in which the shielding layer 17 is disposed, the shielding layer 17 may be formed in a state without the void area, that is, the shielding layer 17 may be formed in a so-called “flat shape”. In that case, the shielding layer 17 may be formed (in a flat shape) on the second main surface F2 of the glass substrate 11. The reason for this is because, since a thickness of the shielding layer 17 is approximately 5 μm to 25 μm, even in a case in which a structure having the shielding layer 17 interposed therein is employed, a change in coupling capacitance between the antenna conductor 12 and the antenna electrode 15 is small, and capacitive coupling between the antenna conductor 12 and the antenna electrode 15 is possible regardless of the presence or absence of the shielding layer 17. In the following description, unless otherwise specified, description will be made assuming that the shielding layer 17 having a void area is formed in the vehicle antenna device 1.

The feeding point 16 is an exposed portion at which the conductive film 13 is exposed. The feeding point 16 is electrically connected to the conductive film 13. The vehicle antenna device 1 is capable of receiving AM broadcast band from the feeding point 16. The feeding point 16 is disposed at a center portion of the conductive film 13 at a distance of 150 mm or more inward from an end side of the glass substrate 11 in a plan view of the glass substrate 11. Further, even in a case in which the shielding layer 17 is formed in a flat shape without a void area as described above, the feeding point 16 need only be electrically connected by capacitive coupling. Further, the feeding point 16 is preferably at a distance of 200 mm or more inward from the end side of the glass substrate 11, and more preferably at a distance of 300 mm or more inward from the end side of the glass substrate 11.

FIG. 3C is a plan view of the vehicle glass 10 from the inside of the vehicle (the side of the second main surface F2). As shown in FIG. 3C, the antenna electrode 15 is formed in a rectangular shape (including a substantially rectangular shape) in a plan view of the glass substrate 11. Here, the antenna electrode 15 is disposed on the side of the second main surface F2 and is formed in a square shape.

Also, the feeding point 16 is formed in a square loop shape in a plan view of the glass substrate 11. That is, an outer edge and an inner edge of the feeding point 16 have a square shape. Further, the “loop shape” may be a closed loop that is continuous throughout one circumference, or may be a shape having notches at one or more locations. In a case in which the feeding point 16 has a notch, when a length of one circumference in the closed loop is standardized as “100”, a length of the notch portion may be, for example, 40 or less, 30 or less, or 20 or less. Also, the length of the notch portion based on the above-described standardization may be, for example, 1 or more, 2 or more, or 5 or more.

The feeding point 16 is an example of a first feeding point that receives AM broadcast band, and the antenna electrode 15 is an example of a second feeding point that receives FM broadcast band.

Returning to the description of FIG. 2 again, the antenna portion 20 includes the antenna 21 and an antenna cover 22.

The antenna 21 is, for example, an antenna for receiving a frequency band of FM broadcast band, an antenna for receiving a frequency band of digital audio broadcast (DAB) band, an antenna for receiving a frequency band of digital terrestrial television broadcast band, an antenna for receiving a global navigation satellite system (GNSS) of 1.2 GHz band or 1.6 GHz band, an antenna for receiving a satellite digital audio radio service (SDARS) of 2.3 GHz band, or the like.

Here, the frequency band of FM broadcast band (hereinafter referred to as “FM band”) is 76 MHz (megahertz) to 108 MHZ, and the frequency band of DAB Band III broadcast band (hereinafter referred to as “DAB band”) is 174 MHz to 240 MHz. Also, the frequency band of digital terrestrial television broadcast band (hereinafter referred to as “DTV band”) is 470 MHz to 710 MHz. The antenna 21 may be capable of receiving a plurality of frequency bands among the frequency band of FM broadcast band, the frequency band of DAB broadcast band, the frequency band of DTV band, the frequency band of GNSS, and the frequency band of SDARS.

The antenna 21 is disposed on an outer side of the vehicle glass 10 and is connected to the antenna conductor 12.

The antenna cover 22 (cover member) is a protrusion-shaped cover that is grounded on the roof of the vehicle. The antenna cover 22 houses the antenna 21 therein. The antenna cover 22 is, for example, a shark fin antenna cover.

The amplifier 30 amplifies a received signal of AM broadcast band received using the conductive film 13 as an AM antenna and a received signal of FM broadcast band received by the antenna 21, and outputs the amplified signal to, for example, a receiver. An input terminal of the amplifier 30 for AM broadcast band is connected to the feeding point 16, and an input terminal for FM broadcast band is connected to the antenna electrode 15. An output of the amplifier 30 is supplied to the receiver via a transmission line such as a coaxial cable CB. Details of the amplifier 30 will be described later.

The high pass filter 40 is disposed between the conductive film 13 and a ground which is a vehicle body (ground conductor). The high pass filter 40 allows a signal in a frequency band of radio waves of at least one of frequencies of the VHF band and the UHF band to pass and blocks a signal in a frequency band of AM broadcast band between the conductive film 13 and the vehicle body. That is, the high pass filter 40 grounds the conductive film 13 to the vehicle body in the VHF band or higher, and makes the conductive film 13 in an electrically floating state (high impedance state) in the AM band.

The high pass filter 40 is, for example, a capacitor C1. The capacitance of the capacitor C1 is preferably 5 pF to 150 pF, more preferably 5 pF to 100 pF.

A capacitor C1 is a capacitor element connected between conductive film 13 and the vehicle body. Further, the capacitor C1 may be inside the amplifier 30.

Next, an equivalent circuit of the vehicle antenna device 1 of the present embodiment shown in FIG. 2 will be described with reference to FIG. 4.

Figure 4:
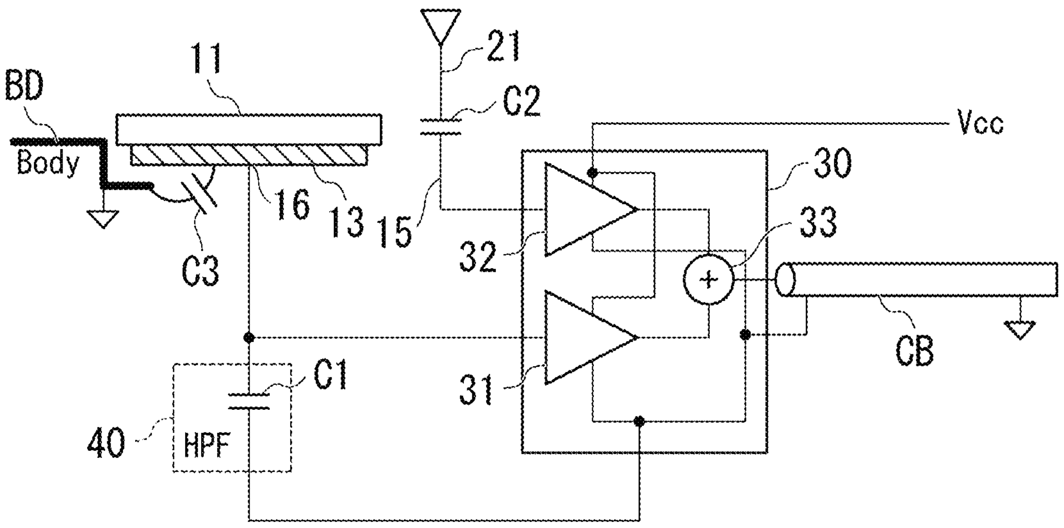
FIG. 4 is a diagram showing an equivalent circuit of the vehicle antenna device of the first embodiment.

FIG. 4 is a diagram showing an equivalent circuit of the vehicle antenna device 1 of the present embodiment.

As shown in FIG. 4, the amplifier 30 includes an AM amplifier 31, an FM amplifier 32, and a signal mixer 33.

In the vehicle antenna device 1 of the present embodiment, the conductive film 13 functions as an AM antenna and functions as an antenna ground for the antenna 21. The conductive film 13 is connected to a ground of the amplifier 30 and a signal ground of the output signal via the capacitor C1 in at least one of the VHF band and UHF band. The ground of the amplifier 30 and the signal ground of the output signal are connected to a vehicle body BD. Further, a capacitance between the vehicle body BD and the conductive film 13 is defined as an antenna capacitance (C3).

The conductive film 13 is connected to an input signal line of the AM amplifier 31 through the feeding point 16. A received signal received by the conductive film 13 as an AM antenna is input to the AM amplifier 31 as an input signal.

Also, the conductive film 13 is electrically disconnected from the ground of the amplifier 30 and the signal ground of the output signal by the capacitor C1 in a frequency band of AM broadcast band.

Also, the antenna 21 is connected to an input signal line of the FM amplifier 32 via a capacitor C2.

The capacitor C2 is a capacitance formed by the antenna conductor 12 to which the antenna 21 is connected and the antenna electrode 15. The capacitor C2 electrically connects the antenna conductor 12 and the antenna electrode 15 by capacitive coupling.

Then, a received signal received by the antenna 21 is input to the FM amplifier 32 as an input signal by capacitive coupling of the capacitor C2.

The AM amplifier 31 amplifies the received signal of the AM broadcast band received by the conductive film 13 and outputs the amplified signal to the signal mixer 33.

The FM amplifier 32 amplifies a received signal having a frequency of the VHF band or higher (for example, FM broadcast band) received by the antenna 21, and outputs the amplified signal to the signal mixer 33. Further, the signal having a frequency of the VHF band or higher refers to, for example, one or more signals having a frequency of at least one of the VHF band frequency and the UHF band frequency.

The signal mixer 33 outputs a received signal, which is a mixture of a received signal of AM broadcast band output by the AM amplifier 31 and a received signal of a frequency in the VHF band or higher (for example, FM broadcast band) output by the FM amplifier 32, to a receiving device (not shown in the drawings) via the coaxial cable CB.

Next, antenna characteristics of the vehicle antenna device 1 of the present embodiment will be described with reference to FIGS. 5 to 9.

Figure 5:
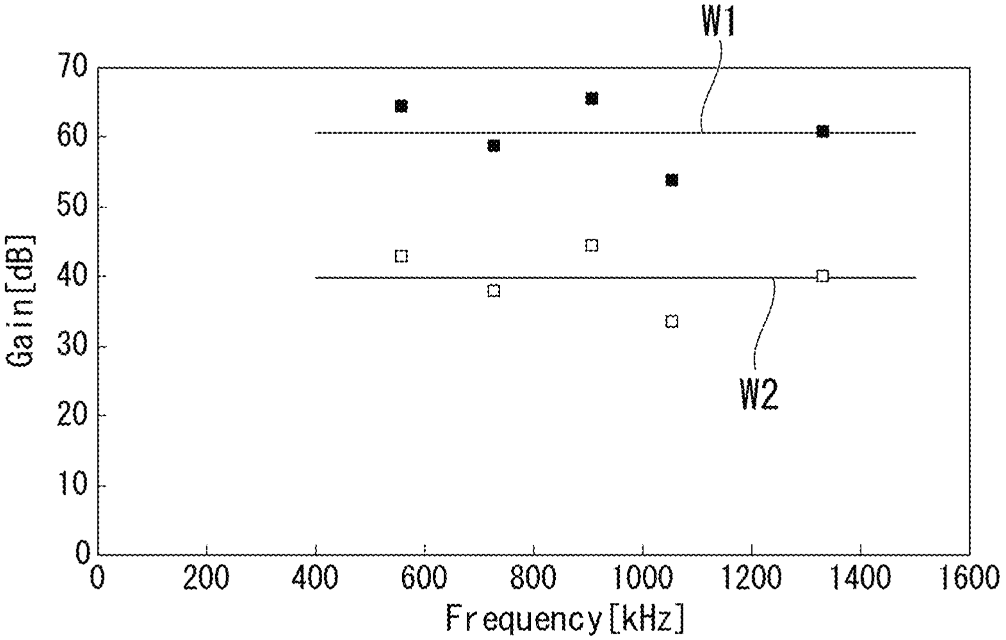
FIG. 5 is a diagram showing antenna characteristics of AM broadcast band of the vehicle antenna device of the first embodiment.

FIG. 5 is a diagram showing antenna characteristics of AM broadcast band of the vehicle antenna device 1 of the present embodiment.

In FIG. 5, the graph shows actual measured values of antenna characteristics in a frequency band of AM broadcast band when the conductive film 13 is a conductor measuring 950 mm×1150 mm. Also, a solid line W1 indicates an antenna sensitivity with an amplifier (the AM amplifier 31), and a solid line W2 indicates an antenna sensitivity without the amplifier. Further, in a case in which the amplifier (the AM amplifier 31), the capacitor C1 with a capacitance of 51 pF is connected.

In FIG. 5, the conductive film 13 functions as an AM antenna that receives a signal of AM broadcast band.

As indicated by the solid line W1 in FIG. 5, the vehicle antenna device 1 can obtain a sufficient antenna sensitivity of approximately 60 dB in the frequency band of AM broadcast band.

Figure 6:
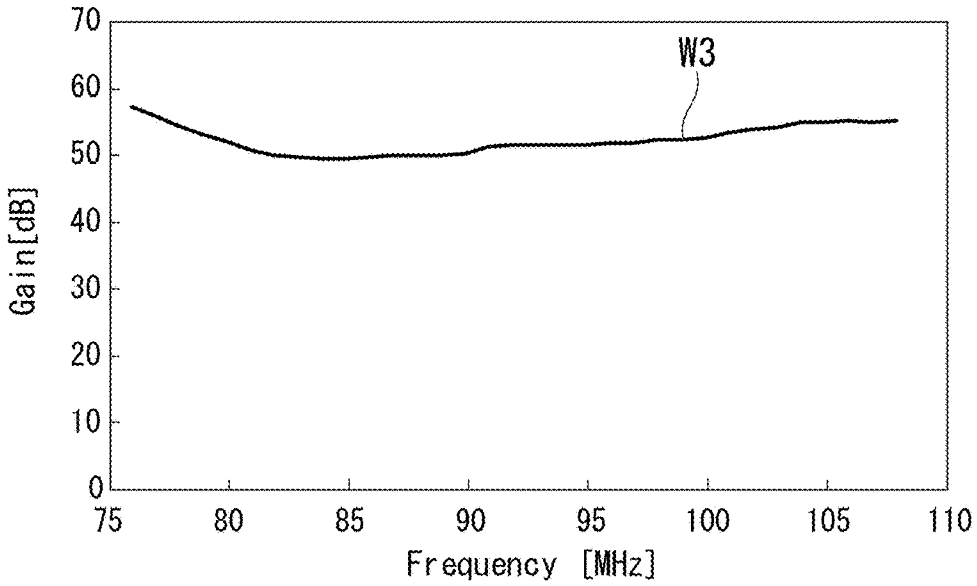
FIG. 6 is a diagram showing antenna characteristics of FM broadcast band of the vehicle antenna device of the first embodiment.

Also, FIG. 6 is a diagram showing antenna characteristics of FM broadcast band of the vehicle antenna device 1 of the present embodiment.

FIG. 6 shows actual measured values of antenna characteristics in a frequency band of FM broadcast band in a case in which the conductive film 13 is a conductor measuring 950 mm×1150 mm (solid line W3). The conductive film 13 functions as an antenna ground and is connected to the capacitor C1 having a grounded capacitance of 51 pF.

As indicated by the solid line W3 in FIG. 6, the vehicle antenna device 1 can obtain a sufficient antenna sensitivity of 50 dB or more in the frequency band of FM broadcast band. Next, antenna characteristics with respect to a grounded capacitance and a sheet resistance of the vehicle antenna device 1 of the present embodiment will be described with reference to FIG. 7.

Figure 7:
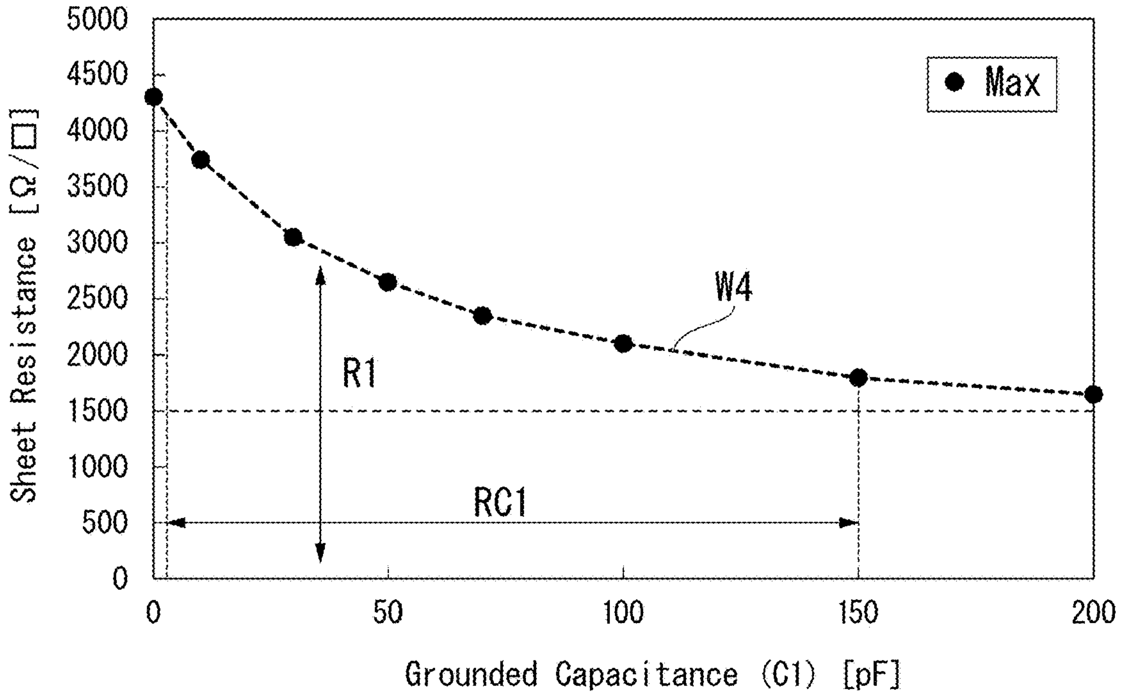
FIG. 7 is a diagram showing a relationship between a grounded capacitance and a sheet resistance of the vehicle antenna device of the first embodiment.

FIG. 7 is a diagram showing a relationship between a grounded capacitance and a sheet resistance of the vehicle antenna device 1 of the present embodiment. FIG. 7 shows simulation values in a case in which a size of the conductive film 13 is 950 mm×1150 mm, the antenna capacitance (C3) is 170 pF, an input capacitance of the AM amplifier 31 is 50 pF, and a frequency is 1000 kHz.

In FIG. 7, the horizontal axis of the graph indicates a capacitance (grounded capacitance) of the capacitor C1. The vertical axis of the graph indicates a sheet resistance value of the conductive film 13. Also, a broken line W4 indicates a sheet resistance value with respect to a capacitance of the capacitor C1 in which a sheet resistance of the conductive film 13 is lowered by −3 dB due to an amount of signal attenuation of 0Ω/□. That is, the broken line W4 indicates a Max value (maximum value) of the sheet resistance that is within −3 dB described above.

Also, in FIG. 7, a range R1 indicates a range of the sheet resistance in which the above-described amount of attenuation is within −3 dB. Also, a range RC1 indicates a range of the capacitance (grounded capacitance) of the capacitor C1 being 5 pF to 150 pF.

As shown in FIG. 7, when the sheet resistance value is set to 1500Ω/□ or lower in the range RC1 of the capacitance of the capacitor C1, a signal sensitivity of AM broadcast band can be sufficiently secured.

Next, antenna characteristics with respect to the grounded capacitance and the antenna capacitance (C3) of the vehicle antenna device 1 of the present embodiment will be described with reference to FIG. 8.

Figure 8:
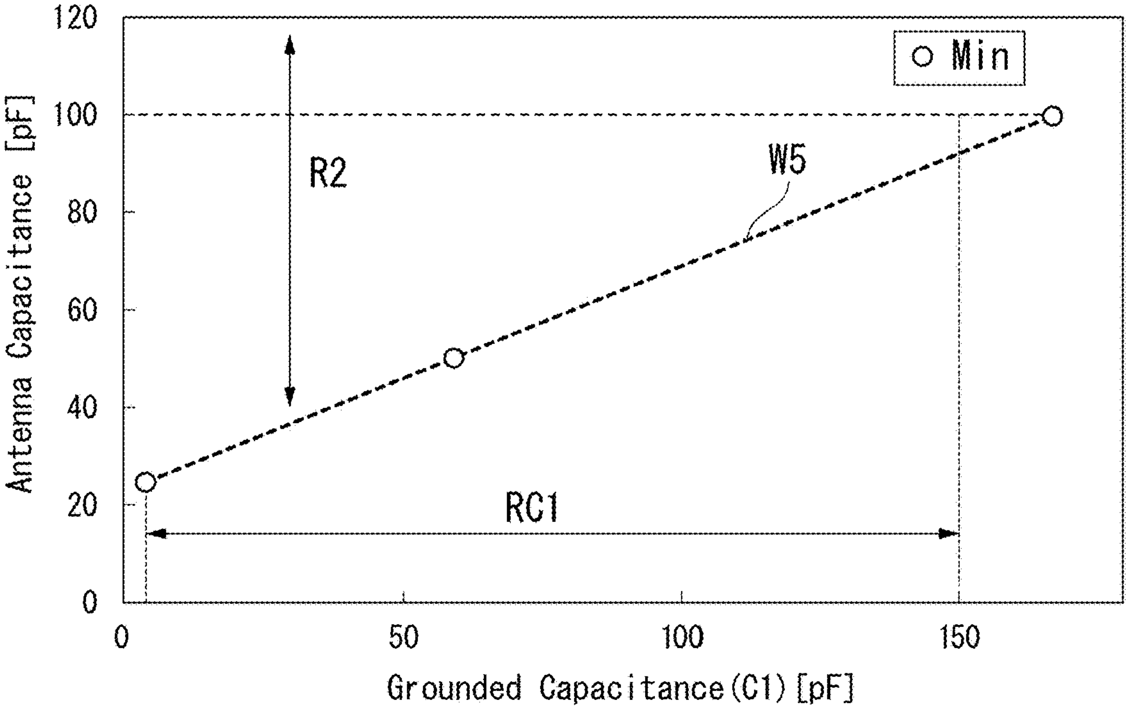
FIG. 8 is a diagram showing a relationship between a grounded capacitance and an antenna capacitance of the vehicle antenna device of the first embodiment.

FIG. 8 is a diagram showing a relationship between a grounded capacitance and an antenna capacitance of the vehicle antenna device 1 of the present embodiment. FIG. 8 shows simulation values in a case in which a size of the conductive film 13 is 950 mm×1150 mm, a sheet resistance is 150Ω/□, an input capacitance of the AM amplifier 31 is 50 pF, and a frequency is 1000 kHz.

In FIG. 8, the horizontal axis of the graph indicates a capacitance of the capacitor C1 (grounded capacitance), and the vertical axis indicates the antenna capacitance (C3). Also, a broken line W5 indicates the antenna capacitance (C3) with respect to a capacitance of the capacitor C1 in which an amount of attenuation of the received signal is −10 dB. That is, the broken line W5 indicates a Min value (minimum value) in which an amount of attenuation of the received signal is-10 dB or more.

Also, in FIG. 8, the range R2 indicates a range of the antenna capacitance (C3) in which the above-described amount of attenuation is-10 dB or more. Also, the range RC1 indicates a range in which the capacitance (grounded capacitance) of the capacitor C1 is 5 pF to 150 pF.

As shown in FIG. 8, when the antenna capacitance (C3) is set to 100 pF or more in the range RC1 of the capacitance of the capacitor C1, a signal sensitivity of AM broadcast band can be secured.

Figure 9:
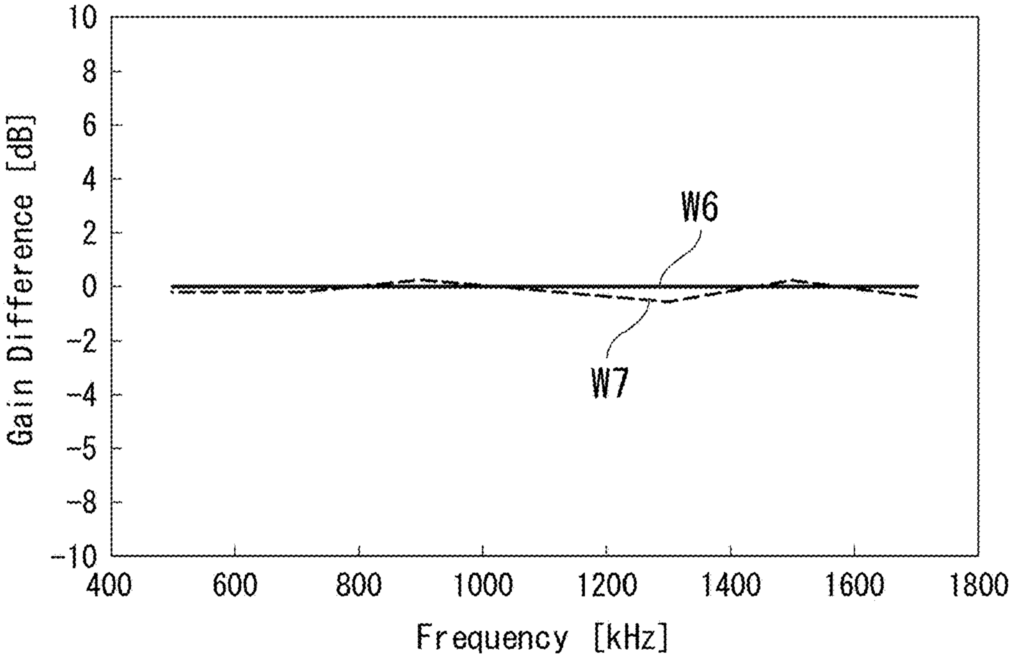
FIG. 9 is a diagram showing an example of antenna characteristics in a case in which a conductive film having high resistance is used in the vehicle antenna device of the first embodiment.

Next, antenna characteristics in a case in which the conductive film 13 has a high resistance will be described with reference to FIG. 9. FIG. 9 is a diagram showing an example of antenna characteristics in a case in which the conductive film 13 having relatively high resistance is used in the vehicle antenna device 1 of the present embodiment.

In FIG. 9, the horizontal axis of the graph represents a received frequency, and the vertical axis represents a received voltage (dB). Also, a solid line W6 indicates an antenna sensitivity in a case in which the conductive film 13 is a copper tape having a size of 50 mm×500 mm, and a broken line W7 indicates an antenna sensitivity in a case in which the conductive film 13 is a conductive film having a size of 50 mm×500 mm and a sheet resistance of 150Ω/□. The solid line W6 and the broken line W7 represent actual measured values.

As shown in FIG. 9, there is no large difference in receiving sensitivity between the copper tape (the solid line W6) having low resistance (for example, 0.1Ω/□ or lower) and the conductive film having high resistance (the broken line W7), and it is possible to secure 60 dB or more in the frequency band of AM broadcast band. That is, the conductive film 13 with relatively high resistance in which the sheet resistance is approximately 150Ω/□ such as a Low-E coat (a conductive film for low emissivity) can be used as the AM antenna. In this case, the Low-E coat is not limited to being applied to a vehicle window glass attached to the roof, and may be applied to a side glass or a rear glass.

As described above, the vehicle antenna device 1 of the present embodiment includes the glass substrate 11 (dielectric substrate) and the conductive film 13. The glass substrate 11 has the first main surface F1 and the second main surface F2. The conductive film 13 is provided on the side of the second main surface F2, and has an area of 0.025 $m^2$ or more in a plan view of the glass substrate 11. The conductive film 13 has a sheet resistance value of $1.5\times10^3$Ω/□ or lower. The sheet resistance value of the conductive film 13 is preferably $1.0\times10^3$Ω/□ or lower, more preferably 500Ω/□ or lower, and particularly preferably 200Ω/□ or lower. The vehicle antenna device 1 is capable of receiving AM broadcast band from the feeding point 16 electrically connected to the conductive film 13.

Therefore, according to the vehicle antenna device 1 of the present embodiment, a coating such as, for example, a conductive film for heat ray reflection (heat ray reflective film) and a conductive film for low emissivity (Low-E coat) can be used as an antenna for AM broadcast band. Therefore, in the vehicle glass 10 (vehicle window glass) using the conductive film 13, the vehicle antenna device 1 of the present embodiment can easily receive AM broadcast band using the conductive film 13.

Further, since it is easier to obtain an antenna gain in the frequency band of AM broadcast band as an area of the conductive film 13 becomes larger, an area of the glass substrate 11 in a plan view is preferably 0.025 $m^2$ or more. Also, since it is easier to obtain an antenna gain in the frequency band of AM broadcast band as the sheet resistance value of the conductive film 13 becomes lower, a sheet resistance value of $1.5\times10^3$Ω/□ or lower is preferable. Therefore, the vehicle antenna device 1 of the present embodiment can obtain a sufficient antenna gain in the frequency band of AM broadcast band.

Also, in the present embodiment, the feeding point 16 is disposed at a center portion of the conductive film 13 at a distance of 150 mm or more from an end side of the glass substrate 11 in a plan view of the glass substrate 11. Also, an outer edge of the conductive film 13 is substantially quadrangular in a plan view of the glass substrate 11.

Therefore, the vehicle antenna device 1 of the present embodiment can easily receive AM broadcast band using the conductive film 13 in, for example, a roof antenna.

Also, in the present embodiment, the feeding point 16 electrically connected to the conductive film 13 is the first feeding point. The vehicle antenna device 1 includes the antenna 21, the antenna electrode 15, the antenna conductor 12, and the high pass filter 40. The antenna 21 is provided on the side of the first main surface F1 and receives radio waves of at least one of the frequencies of the VHF band and the UHF band. The antenna electrode 15 is disposed inside the outer edge of the void area VA provided inside the conductive film 13 in a plan view of the glass substrate 11. The antenna conductor 12 is connected to the antenna 21 and is disposed on the side of the first main surface F1. The high pass filter 40 allows a signal in a frequency band of radio waves of at least one of frequencies of the VHF band and the UHF band to pass and blocks a signal in a frequency band of AM broadcast band between the conductive film 13 and the ground conductor. The antenna conductor 12 is electrically connected to the antenna electrode 15. The vehicle antenna device 1 is capable of receiving radio waves of at least one of the frequencies of the VHF band and the UHF band by a signal received using the antenna electrode 15 as a second feeding point.

Therefore, according to the vehicle antenna device 1 of the present embodiment, the conductive film 13 can be used both as a receiving antenna (AM antenna) of a frequency band of AM broadcast band and as an antenna ground for the antenna 21, and a large area can be secured as the antenna ground. Therefore, the vehicle antenna device 1 of the present embodiment can easily receive AM broadcast band using the conductive film 13, and can obtain a sufficient antenna gain of radio waves of at least one of the frequencies of the VHF band and the UHF band. Also, a sufficient antenna gain can be obtained for the antenna 21 without mechanical processing such as drilling holes in the glass substrate 11.

Also, in the present embodiment, the antenna conductor 12 and the antenna electrode 15 are electrically connected by capacitive coupling.

Therefore, in the vehicle antenna device 1 of the present embodiment, a received signal of the antenna 21 can be taken out from the antenna electrode 15 without performing drilling processing on the glass substrate 11, and the antenna 21 can be installed at any location on the vehicle glass 10.

Also, in the present embodiment, the antenna 21 is capable of receiving a frequency of FM broadcast band. The vehicle antenna device 1 includes the AM amplifier 31 and the FM amplifier 32. A signal in the frequency band of AM broadcast band is input to the AM amplifier 31 from the feeding point 16 (first feeding point). A signal in the frequency band of FM broadcast band is input to the FM amplifier 32 from the antenna electrode 15 (second feeding point). Therefore, the vehicle antenna device 1 of the present embodiment can appropriately receive signals in both the frequency band of AM broadcast band and the frequency band of FM broadcast band.

Also, in the present embodiment, the high pass filter 40 is the capacitor C1. A capacitance of the capacitor C1 is 5 pF to 150 pF. Also, the capacitance of the capacitor C1 is more preferably 5 pF to 100 pF.

Therefore, the vehicle antenna device 1 of the present embodiment can realize the high pass filter 40 with a simple configuration of the capacitor C1.

Also, in the present embodiment, the antenna 21 is disposed to be surrounded by the antenna cover 22 (cover member) that protrudes outward from the side of the first main surface F1 of the glass substrate 11. Also, the dielectric substrate is the glass substrate 11. Also, the glass substrate 11 may be attached to the roof of the vehicle parallel to a horizontal surface of the vehicle, but may also be applied as a side glass or a rear glass. Therefore, according to the vehicle antenna device 1 of the present embodiment, a sufficient antenna gain can be obtained, for example, in the roof glass without mechanical processing of the glass substrate 11.

Second Embodiment

Next, a vehicle antenna device 1*a* of a second embodiment will be described with reference to the drawings. In the present embodiment, a modified example of a case in which an antenna conductor 12*a* and an antenna electrode 15*a* are directly connected by a connection conductor 18 will be described.

Figure 10:
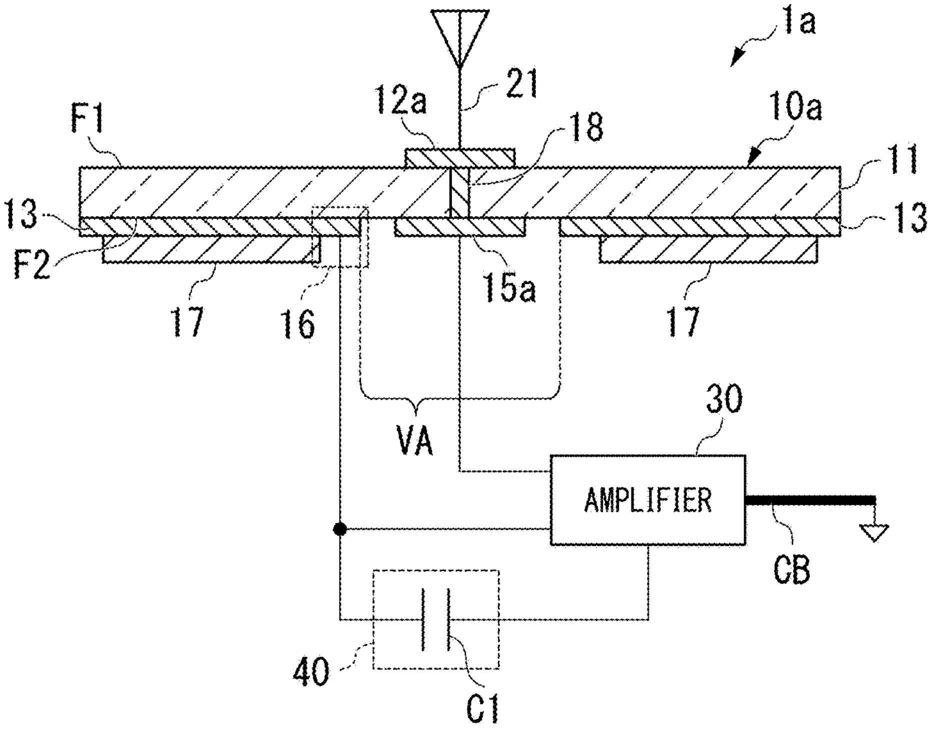
FIG. 10 is a cross-sectional view showing an example of a vehicle antenna device according to a second embodiment.

FIG. 10 is a cross-sectional view showing an example of the vehicle antenna device 1*a* of the second embodiment.

In addition, since a perspective view of the vehicle antenna device 1*a* of the present embodiment is the same as that of the first embodiment shown in FIG. 1 described above, description thereof will be omitted here. Also, in FIG. 10, since a configuration of an antenna cover 22 is the same as that of the first embodiment shown in FIG. 2, illustration thereof will be omitted here.

As shown in FIG. 10, the vehicle antenna device 1*a* includes a vehicle glass 10*a*, an amplifier 30, and a high pass filter 40. The vehicle glass 10*a* includes a glass substrate 11, the antenna conductor 12*a*, a conductive film 13, the antenna electrode 15*a*, a feeding point 16, a shielding layer 17, and the connection conductor 18.

Further, in FIG. 10, components the same as those in the first embodiment shown in FIG. 2 will be denoted by the same reference signs, and description thereof will be omitted.

The connection conductor 18 is a conductor disposed in a through hole of the glass substrate 11.

The antenna conductor 12*a* and the antenna electrode 15*a* of the present embodiment are directly connected by the connection conductor 18.

Other configurations of the present embodiment are the same as those of the first embodiment shown in FIG. 2 described above, and therefore descriptions thereof will be omitted here.

Further, in the present embodiment, a signal in a frequency band of AM broadcast band is input to the AM amplifier 31 of the amplifier 30 from the feeding point 16 (first feeding point). Further, a signal in a frequency band of FM broadcast band is input to an FM amplifier 32 of the amplifier 30 from the antenna electrode 15*a* (second feeding point).

As described above, in the present embodiment, the antenna conductor 12*a* and the antenna electrode 15*a* are directly connected by the connection conductor 18 disposed in the through hole of the glass substrate 11.

Therefore, according to the vehicle antenna device 1*a* of the present embodiment, a sufficient antenna gain of an antenna 21 can be obtained with minimal mechanical processing of the glass substrate 11 as in the first embodiment.

Third Embodiment

Next, a vehicle antenna device 1*b* of a third embodiment will be described with reference to the drawings. In the present embodiment, a modified example in a case of using a laminated glass will be described.

Figure 11:
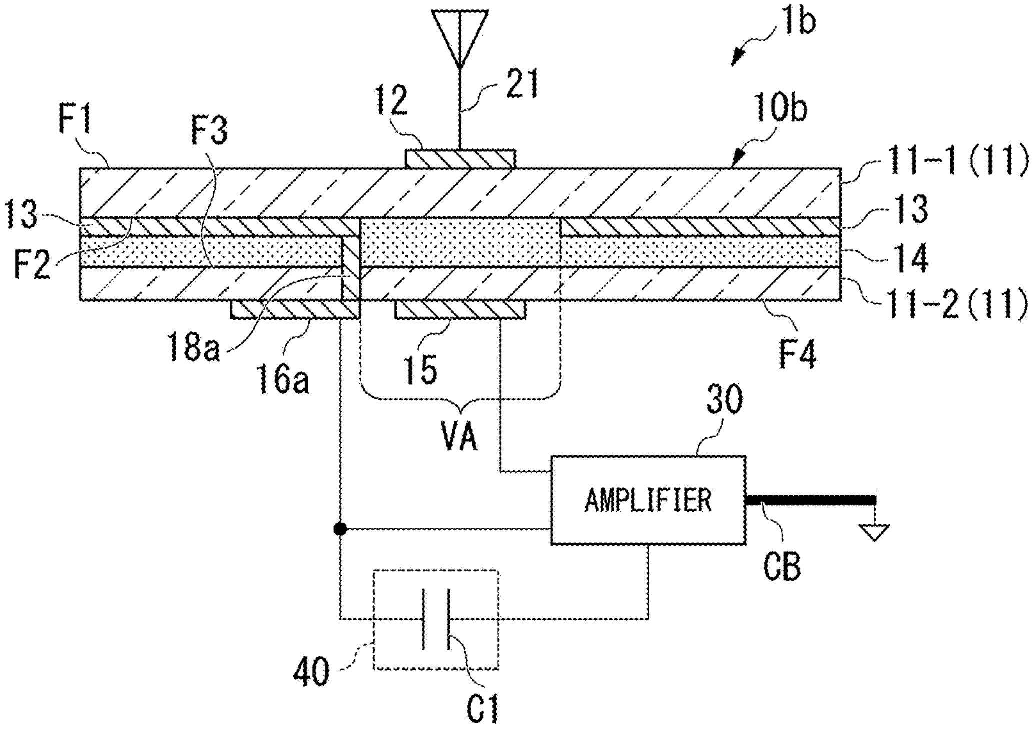
FIG. 11 is a cross-sectional view showing an example of a vehicle antenna device according to a third embodiment.

FIG. 11 is a cross-sectional view showing an example of the vehicle antenna device 1*b* of the present embodiment.

Further, since a perspective view of the vehicle antenna device 1*b* of the present embodiment is the same as that of the first embodiment shown in FIG. 1 described above, description thereof will be omitted here. Also, in FIG. 11, since a configuration of an antenna cover 22 is the same as that of the first embodiment shown in FIG. 2, illustration thereof will be omitted here.

As shown in FIG. 11, the vehicle antenna device 1*b* includes a vehicle glass 10*b*, an amplifier 30, and a high pass filter 40.

The vehicle glass 10*b* is, for example, a laminated glass. The vehicle glass 10*b* includes two glass substrates 11 (11-1 and 11-2), an antenna conductor 12, a conductive film 13, an intermediate film 14, an antenna electrode 15, a signal electrode 16*a*, and a connection conductor 18*a*.

The glass substrate 11-1 (an example of a first dielectric substrate) and the glass substrate 11-2 (an example of a second dielectric substrate) are glass substrates for the laminated glass adhered together by the intermediate film 14. Each of the glass substrate 11-1 and the glass substrate 11-2 is an example of a dielectric substrate. Further, the glass substrate 11-1 may also be referred to as a first glass substrate. The glass substrate 11-2 may also be referred to as a second glass substrate.

In the present embodiment, a main surface of the glass substrate 11-1 on an outer side of a vehicle is a first main surface F1. A main surface on a side opposite to the side of the first main surface F1 is a second main surface F2. Further, a main surface of the glass substrate 11-2 on the side of the glass substrate 11-1 is a third main surface F3. A main surface on a side opposite to the third main surface F3 is a fourth main surface F4.

The glass substrate 11-2 is disposed parallel to the second main surface F2 to face the side of the second main surface F2 of the glass substrate 11-1. The conductive film 13 and the intermediate film 14 are sandwiched between the glass substrate 11-1 and the glass substrate 11-2. The conductive film 13 is disposed to be in contact with the second main surface F2 as shown in FIG. 11, but may be disposed to be in contact with the third main surface F3.

Also, the intermediate film 14 may have a configuration in which a plurality of layers are laminated. In this case, the conductive film 13 may be disposed to be inserted between layers of the plurality of intermediate films 14. In this case, as the conductive film 13, a conductor contained in a light control film capable of controlling a visible light transmittance when an AC voltage is applied may be exemplified. The light control film has a pair of resin substrates, a pair of indium tin oxide (ITO) films, a transparent conductive polymer, a laminated film of a metal layer and a dielectric layer, a conductive film 13 such as a silver nanowire and a silver or copper metal mesh, and a light control layer sandwiched between a pair of conductive films 13. In the light control film, the ITO films are provided on main surfaces of the resin substrates. Since the main surfaces of the pair of resin substrates face each other, the pair of ITO films also face each other. The light control layer is a molecular layer such as liquid crystal having optical anisotropy. The conductive film 13 may be a conductive film included in a solar cell panel.

In FIG. 11, although the conductive film 13 is shown as one layer for convenience, in a case in which the conductive film 13 includes a light control film, the conductive film 13 is a pair of conductive films. Further, the vehicle glass 10*b* may have a shielding layer 17 (not shown in the drawings) that shields visible light as described in the first embodiment. The shielding layer 17 can be disposed on at least one of the second main surface F2, the third main surface F3, and the fourth main surface F4. The shielding layer 17 may be disposed, for example, only on the fourth main surface F4.

The intermediate film 14 is an adhesive layer such as, for example, a transparent polyvinyl butyral (PVB) film, an ethylene vinyl acetate copolymer (EVA) film, and a cycloolefin polymer (COP) film. The intermediate film 14 is disposed between the glass substrate 11-1 and the glass substrate 11-2. The intermediate film 14 adheres the glass substrate 11-1, the conductive film 13, and the glass substrate 11-2 together. The laminated glass is formed by a laminated structure adhered by the intermediate film 14.

In the present embodiment, the antenna electrode 15 is disposed inside an outer edge of a void area VA in a plan view of the glass substrate 11-2 (11). The antenna electrode 15 is disposed on the side of the second main surface F2 and is electrically connected to the antenna conductor 12. The antenna electrode 15 is disposed in contact with, for example, the fourth main surface F4 of the glass substrate 11-2. The antenna electrode 15 is formed to face the antenna conductor 12. The glass substrate 11-1, the intermediate film 14, and the glass substrate 11-2 are sandwiched between the antenna electrode 15 and the antenna conductor 12. In the present embodiment, the antenna conductor 12 and the antenna electrode 15 are disposed to be electrically connected by capacitive coupling. Here, the antenna electrode 15 functions as a second feeding point.

Further, thicknesses of the glass substrate 11-1, the intermediate film 14, and the glass substrate 11-2 are, for example, approximately 2 mm, approximately 1 mm, and approximately 2 mm, respectively. A distance between the antenna conductor 12 and the antenna electrode 15 is approximately 5 mm. In order for a signal at a frequency in a VHF band or a signal at a frequency in a UHF band to be capacitively coupled, a distance of a dielectric between conductors need only be less than 30 mm, is preferably 20 mm or less, and is more preferably 10 mm or less. Since a thickness of the vehicle glass 10*b* is typically approximately 5 mm as described above, the distance between the antenna conductor 12 and the antenna electrode 15 is sufficient for capacitive coupling. In this way, if a thickness of the vehicle glass 10*b*, which is a laminated glass, is less than 30 mm, capacitive coupling between the antenna conductor 12 and the antenna electrode 15 is possible. It can be configured as a circuit that amplifies a signal received by the antenna 21 with the amplifier 30.

The signal electrode 16*a* is an electrode disposed on the side of the fourth main surface F4 of the glass substrate 11-2, and functions as a feeding point of the conductive film 13 functioning as an AM antenna that receives AM broadcast band. The signal electrode 16*a* is disposed to be electrically connected to the conductive film 13 by the connection conductor 18*a*. In this way, the signal electrode 16*a* is disposed at a position overlapping the conductive film 13 in a plan view of the glass substrate 11-2 (11).

The connection conductor 18*a* is a conductor penetrating the glass substrate 11-2. The connection conductor 18*a* directly connects the conductive film 13 and the signal electrode 16*a* electrically.

Other configurations of the present embodiment are the same as those of the first embodiment shown in FIG. 2 described above, and therefore descriptions thereof will be omitted here.

Further, in the present embodiment, a signal in a frequency band of AM broadcast band is input to an AM amplifier 31 of the amplifier 30 from the signal electrode 16*a* (first feeding point). Also, a signal in a frequency band of FM broadcast band is input to an FM amplifier 32 of the amplifier 30 from the antenna electrode 15 (second feeding point).

As described above, in the present embodiment, the glass substrate 11 is the glass substrate 11-1 (first dielectric substrate). The vehicle antenna device 1*b* includes the glass substrate 11-2 disposed on the side of the second main surface F2 of the glass substrate 11-1 parallel to the second main surface F2, and the intermediate film 14 disposed between the glass substrate 11-1 and the glass substrate 11-2. The glass substrate 11-2 has the third main surface F3 on the side of the glass substrate 11-1 and the fourth main surface F4 on a side opposite to the third main surface F3. The conductive film 13 is disposed between the glass substrate 11-1 and the glass substrate 11-2, and the antenna electrode 15 is disposed on the side of the fourth main surface F4. The conductive film 13 is disposed in contact with, for example, the second main surface F2.

Therefore, according to the vehicle antenna device 1*b* of the present embodiment, even in a case in which the laminated glass including the glass substrate 11-1 (first dielectric substrate) and the glass substrate 11-2 is used, the same effects as in the first embodiment described above are achieved, and AM broadcast band can be easily received using the conductive film 13 in the vehicle glass 10*b* using the conductive film 13. Also, the vehicle antenna device 1*b* of the present embodiment can obtain a sufficient antenna gain for the antenna 21 with minimal mechanical processing of the glass substrate 11.

Fourth Embodiment

Next, a vehicle antenna device 1*c* of a fourth embodiment will be described with reference to the drawings. In the present embodiment, a modified example in which a laminated glass is used, and a conductive film 13*a*, which is a light control film, is provided will be described.

Figure 12:
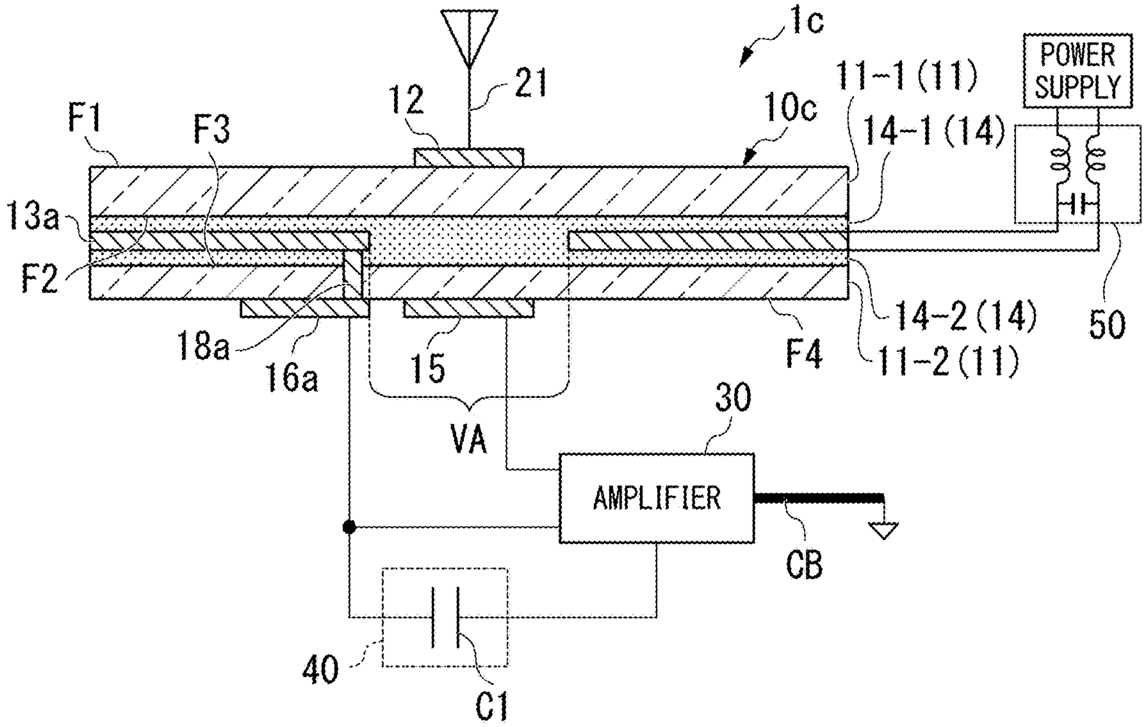
FIG. 12 is a cross-sectional view showing an example of a vehicle antenna device according to a fourth embodiment.

FIG. 12 is a cross-sectional view showing an example of the vehicle antenna device 1*c* of the present embodiment.

Further, since a perspective view of the vehicle antenna device 1*c* of the present embodiment is the same as that of the first embodiment shown in FIG. 1 described above, description thereof will be omitted here. Also, in FIG. 12, since a configuration of an antenna cover 22 is the same as that of the first embodiment shown in FIG. 2, illustration thereof will be omitted here.

As shown in FIG. 12, the vehicle antenna device 1*c* includes a vehicle glass 10*c*, an amplifier 30, and a high pass filter 40.

The vehicle glass 10*c* is, for example, a laminated glass. The vehicle glass 10*c* includes two glass substrates 11 (11-1 and 11-2), an antenna conductor 12, the conductive film 13*a*, intermediate films 14 (14-1 and 14-2), and an antenna electrode 15, a signal electrode 16*a*, and a connection conductor 18*a*.

Further, in FIG. 12, components the same as those in the third embodiment shown in FIG. 11 will be denoted by the same reference signs, and description thereof will be omitted.

Further, in the present embodiment, the intermediate film 14 includes the intermediate film 14-1 (first intermediate film) and the intermediate film 14-2 (second intermediate film).

The intermediate film 14-1 and the intermediate film 14-2 are, for example, a PVB film, an EVA film, a COP film, or the like, but it is preferable that the same material be used for the intermediate film 14-1 and the intermediate film 14-2.

The conductive film 13*a* is a light control film containing a conductor. The conductive film 13*a* is sandwiched between the intermediate film 14-1 and the intermediate film 14-2. In FIG. 12, although the conductive film 13*a* is shown as one layer for convenience, in a case in which the conductive film 13*a* includes a light control film, the conductive film 13*a* is a pair of conductive films. The conductive film 13*a* is disposed to be sandwiched between the intermediate film 14-1 and the intermediate film 14-2.

Also, the connection conductor 18*a* of the present embodiment is a conductor penetrating the glass substrate 11-2. The connection conductor 18*a* directly connects the conductive film 13*a* and the signal electrode 16*a* electrically.

Further, in the present embodiment, the conductive film 13*a*, which is a light control film, functions as an AM antenna and functions as an antenna ground for an antenna 21. A signal in a frequency band of AM broadcast band received by the conductive film 13*a*, which is a light control film, is input to an AM amplifier 31 of the amplifier 30 from the signal electrode 16*a* (first feeding point). Also, a signal in a frequency band of FM broadcast band is input to an FM amplifier 32 of the amplifier 30 from the antenna electrode 15 (second feeding point).

Also, a choke coil 50 is connected to the conductive film 13*a*, which is a light control film, to prevent leakage of a received signal of AM broadcast band.

As described above, in the present embodiment, the intermediate film 14 includes the intermediate film 14-1 (first intermediate film) and the intermediate film 14-2 (second intermediate film). The conductive film 13*a* is sandwiched between the intermediate film 14-1 and the intermediate film 14-2. The conductive film 13*a* is a light control film containing a conductor.

Therefore, according to the vehicle antenna device 1*c* of the present embodiment, the conductive film 13*a* is disposed between the glass substrate 11-1 (first dielectric substrate) and the glass substrate 11-2 (second dielectric substrate). Therefore, for example, even if the conductive film 13*a* is a light control film, the same effects as in the third embodiment described above are achieved, and AM broadcast band can be easily received using the conductive film 13*a* in the vehicle glass 10*c* that uses the conductive film 13*a* which is a light control film. Also, according to the vehicle antenna device 1*c* of the present embodiment, since the conductive film 13*a*, which is a light control film, functions as an antenna ground for the antenna 21, a sufficient antenna gain can be obtained for the antenna 21 with minimal mechanical processing of the glass substrate 11.

Fifth Embodiment

Next, a vehicle antenna device 1*d* of a fifth embodiment will be described with reference to the drawings. In the present embodiment, a modified example in which a laminated glass is used, and a conductive film 13*b*, which is a conductive film for heat ray reflection (heat ray reflective film) or a conductive film for low emissivity (Low-E coat), is provided will be described.

Figure 13:
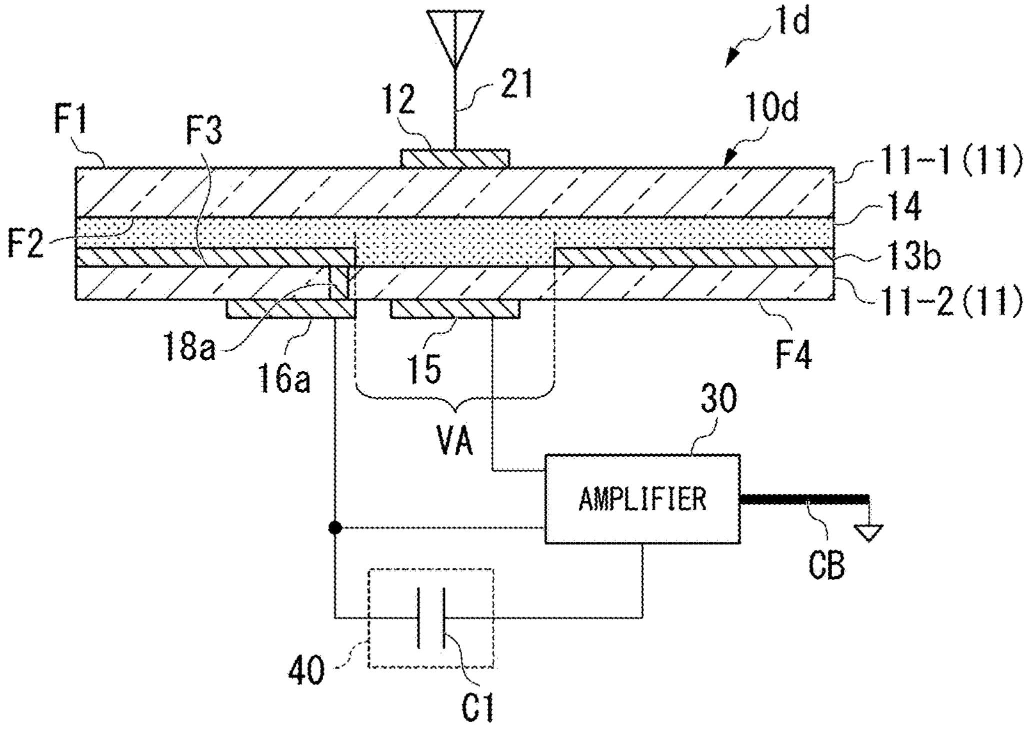
FIG. 13 is a cross-sectional view showing an example of a vehicle antenna device according to a fifth embodiment.

FIG. 13 is a cross-sectional view showing an example of the vehicle antenna device 1*d* of the present embodiment.

Further, since a perspective view of the vehicle antenna device 1*d* of the present embodiment is the same as that of the first embodiment shown in FIG. 1 described above, description thereof will be omitted here. Also, in FIG. 13, since a configuration of an antenna cover 22 is the same as that of the first embodiment shown in FIG. 2, illustration thereof will be omitted here.

As shown in FIG. 13, the vehicle antenna device 1*d* includes a vehicle glass 10*d*, an amplifier 30, and a high pass filter 40.

The vehicle glass 10*d* is, for example, a laminated glass. The vehicle glass 10*d* includes two glass substrates 11 (11-1 and 11-2), an antenna conductor 12, the conductive film 13*b*, an intermediate film 14, an antenna electrode 15, a signal electrode 16*a*, and a connection conductor 18*a*.

Further, in FIG. 13, components the same as those in the third embodiment shown in FIG. 11 will be denoted by the same reference signs, and description thereof will be omitted.

The conductive film 13*b* is, for example, a conductive film for heat ray reflection (heat ray reflective film) or a conductive film for low emissivity (Low-E coat). The conductive film 13*b* is disposed in contact with a third main surface F3 of the glass substrate 11-2 between the intermediate film 14 and the glass substrate 11-2. Further, the conductive film 13*b* may be disposed in contact with a fourth main surface F4 of the glass substrate 11-2.

Also, the connection conductor 18*a* of the present embodiment is a conductor penetrating the glass substrate 11-2. The connection conductor 18*a* directly connects the conductive film 13*b* and the signal electrode 16*a* electrically.

Further, in the present embodiment, the conductive film 13*b* functions as an AM antenna and functions as an antenna ground for an antenna 21. A signal in a frequency band of AM broadcast band received by the conductive film 13*b* is input to an AM amplifier 31 of the amplifier 30 from the signal electrode 16*a* (first feeding point). Also, a signal in a frequency band of FM broadcast band is input to an FM amplifier 32 of the amplifier 30 from the antenna electrode 15 (second feeding point).

As described above, in the present embodiment, the conductive film 13*b* is disposed in contact with the third main surface F3 or the fourth main surface F4. The conductive film 13*b* is, for example, a conductive film for heat ray reflection (heat ray reflective film) or a conductive film for low emissivity (Low-E coat).

Therefore, according to the vehicle antenna device 1*d* of the present embodiment, even in a case in which the conductive film 13*b* is disposed in contact with the third main surface F3 or the fourth main surface F4, the same effects as in the third embodiment described above are achieved, and AM broadcast band can be easily received using the conductive film 13*b*. Also, in the vehicle antenna device 1*d* of the present embodiment, since the conductive film 13*b* functions as an antenna ground for the antenna 21, a sufficient antenna gain can be obtained for the antenna 21 with minimal mechanical processing of the glass substrate 11.

Sixth Embodiment

Next, a vehicle antenna device 1*e* of a sixth embodiment will be described with reference to the drawings. In the present embodiment, a modified example in which a laminated glass is used, and both a conductive film 13 which is a conductive film for heat ray reflection (heat ray reflective film) and a conductive film 13*a* which is a light control film are provided will be described.

Figure 14:
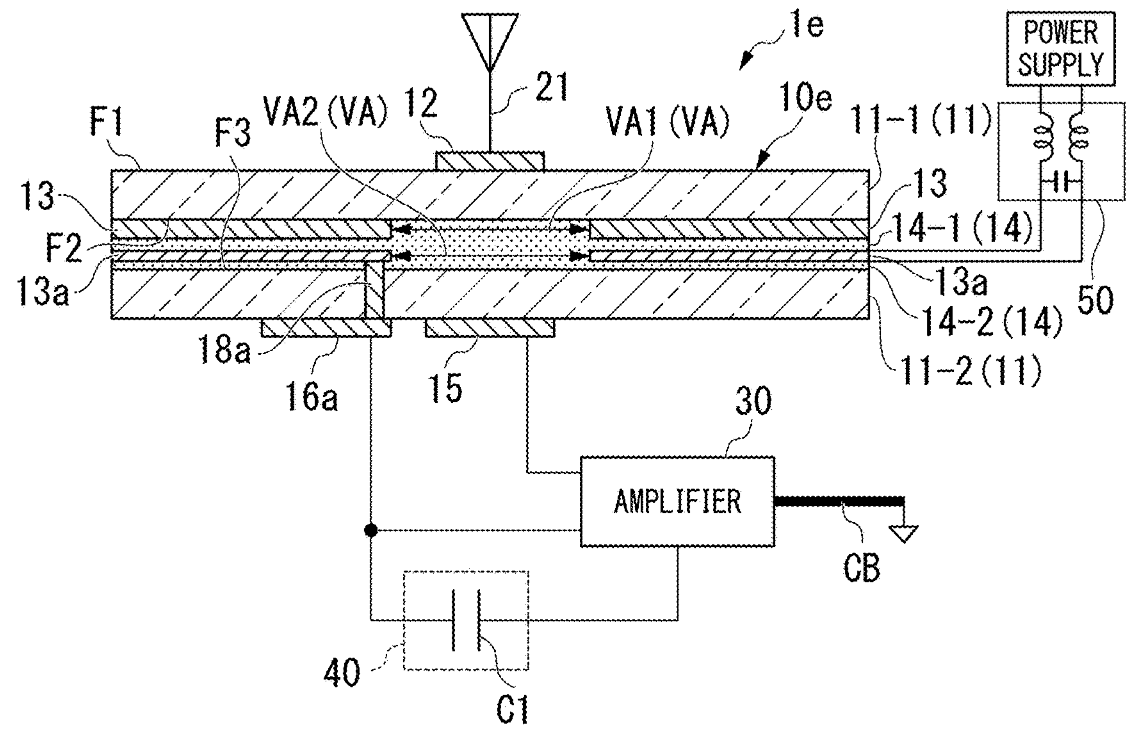
FIG. 14 is a cross-sectional view showing an example of a vehicle antenna device according to a sixth embodiment.

FIG. 14 is a cross-sectional view showing an example of the vehicle antenna device 1*e* of the present embodiment.

Further, since a perspective view of the vehicle antenna device 1*e* of the present embodiment is the same as that of the first embodiment shown in FIG. 1 described above, description thereof will be omitted here. Also, in FIG. 14, since a configuration of an antenna cover 22 is the same as that of the first embodiment shown in FIG. 2, illustration thereof will be omitted here. Also, as in the fourth embodiment shown in FIG. 12, a choke coil 50 is connected to the conductive film 13*a*, which is a light control film, to prevent leakage of a received signal of AM broadcast band.

As shown in FIG. 14, the vehicle antenna device 1*e* includes a vehicle glass 10*e*, an amplifier 30, and a high pass filter 40.

The vehicle glass 10*e* is, for example, a laminated glass. The vehicle glass 10*e* includes two glass substrates 11 (11-1 and 11-2), an antenna conductor 12, the conductive film 13 and the conductive film 13*a*, intermediate films 14 (14-1 and 14-2), an antenna electrode 15, a signal electrode 16*a*, and a connection conductor 18*a*.

Further, in FIG. 14, components the same as those in the third embodiment and fourth embodiment shown in FIGS. 11 and 12 will be denoted by the same reference signs, and description thereof will be omitted.

The conductive film 13 is, for example, a conductive film for heat ray reflection (heat ray reflective film). The conductive film 13 is disposed in contact with a second main surface F2 of the glass substrate 11-1. A sheet resistance value of the conductive film 13 is, for example, lower than a sheet resistance value of the conductive film 13*a*.

Also, the conductive film 13*a* is, for example, a light control film containing a conductor. The light control film is a light control film in which a transmittance of light can be electrically changed, and includes, for example, a transparent conductive film such as ITO. In FIG. 14, although the conductive film 13*a* is shown as one layer for convenience, in a case in which the conductive film 13*a* includes a light control film, the conductive film 13*a* is a pair of conductive films. The conductive film 13*a* is disposed to be sandwiched between the intermediate film 14-1 and the intermediate film 14-2. The conductive film 13*a* has a second void area VA2 disposed to overlap a first void area VA1 which is a void area VA of the conductive film 13 in a plan view of the glass substrate 11-1. Further, in a plan view of the glass substrate 11-1, it is preferable that an outer edge of the first void area VA1 and an outer edge of the second void area VA2 coincide, although some deviation therebetween is allowable.

Further, the intermediate film 14 of the present embodiment includes the intermediate film 14-1 (first intermediate film) and the intermediate film 14-2 (second intermediate film). The intermediate film 14-1 and the intermediate film 14-2 are, for example, a PVB film, an EVA film, a COP film, or the like, but it is preferable that the same material be used for the intermediate film 14-1 and the intermediate film 14-2.

Also, the connection conductor 18*a* of the present embodiment is a conductor penetrating the glass substrate 11-2. The connection conductor 18*a* directly connects the conductive film 13*a* and the signal electrode 16*a* electrically. Alternatively, the connection conductor 18*a* may directly connect the conductive film 13 and the signal electrode 16*a* electrically.

Further, in the present embodiment, the conductive film 13*a* which is a light control film or the conductive film 13 for heat ray reflection functions as an AM antenna and functions as an antenna ground for an antenna 21. A signal in a frequency band of AM broadcast band received by the conductive film 13*a* which is a light control film or the conductive film 13 for heat ray reflection is input to an AM amplifier 31 of the amplifier 30 from the signal electrode 16*a* (first feeding point). Also, a signal in a frequency band of FM broadcast band is input to an FM amplifier 32 of the amplifier 30 from the antenna electrode 15 (second feeding point).

As described above, in the present embodiment, the intermediate film 14 includes the intermediate film 14-1 and the intermediate film 14-2, and the conductive film includes the conductive film 13 (first conductive film) and the conductive film 13*a* (second conductive film). The conductive film 13 and the conductive film 13*a* are disposed at two positions among a position on the second main surface F2, a position between the intermediate film 14-1 and the intermediate film 14-2, a position on a third main surface F3, and a position on a fourth main surface F4, and are disposed in order from a side close to the glass substrate 11-1. The conductive film 13*a* has the second void area VA2 disposed to overlap the first void area VA1 which is the void area VA of the conductive film 13 in a plan view of the glass substrate 11-1.

Therefore, according to the vehicle antenna device 1*e* of the present embodiment, even in a case in which both the conductive film 13 and the conductive film 13*a* are provided, the same effects as in the third embodiment described above are achieved, and AM broadcast band can be easily received using the conductive film 13*a* or the conductive film 13. Also, in the vehicle antenna device 1*e* of the present embodiment, since the conductive film 13*a* or the conductive film 13 functions as an antenna ground for the antenna 21, a sufficient antenna gain can be obtained for the antenna 21 with minimal mechanical processing of the glass substrate 11.

Also, in the present embodiment, the conductive film 13 is disposed in contact with the second main surface F2, and the conductive film 13*a* is sandwiched between the intermediate film 14-1 and the intermediate film 14-2. The conductive film 13 is, for example, a conductor for heat ray reflection (heat ray reflective film), and the conductive film 13*a* is, for example, a light control film containing a conductor.

Therefore, the vehicle antenna device 1*e* of the present embodiment can easily receive AM broadcast band even in a case in which, for example, both the conductor for heat ray reflection (heat ray reflective film) and the light control film are provided.

Seventh Embodiment

Next, a vehicle antenna device 1*f* of a seventh embodiment will be described with reference to the drawings. In the present embodiment, a modified example in which a laminated glass is used, and both a conductive film 13*a* which is a light control film and a conductive film 13*c* which is a conductor for a low emissivity film (Low-E coat) are provided will be described.

Figure 15:
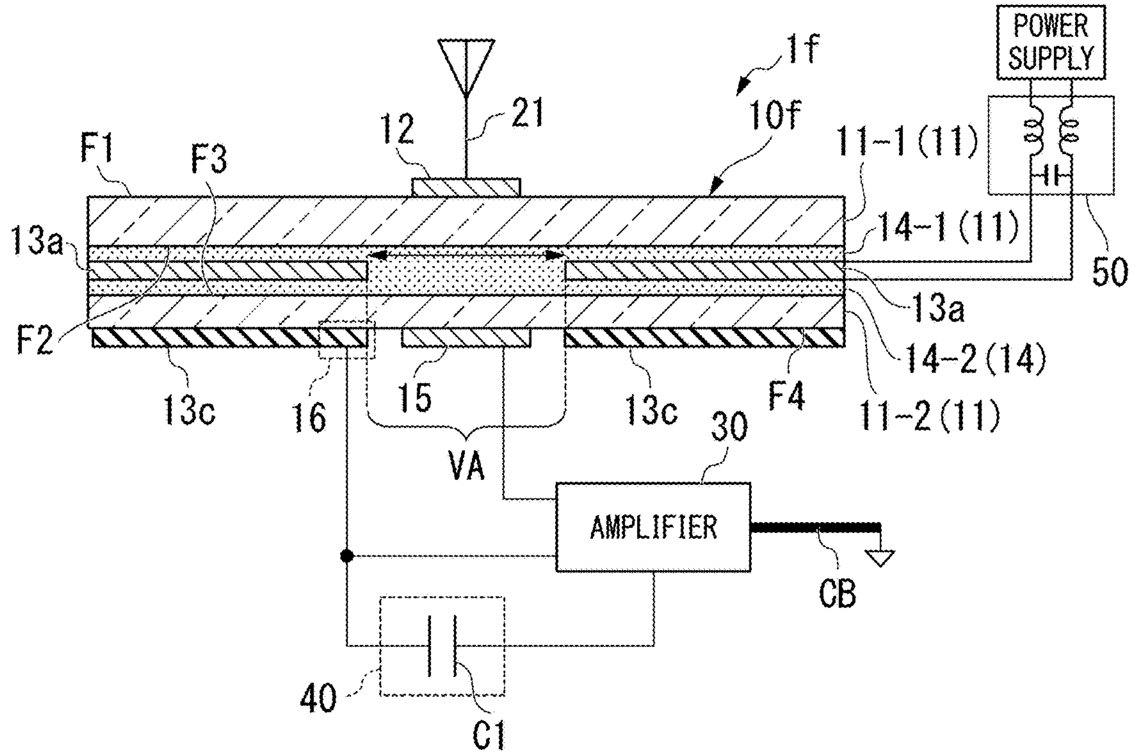
FIG. 15 is a cross-sectional view showing an example of a vehicle antenna device according to a seventh embodiment.

FIG. 15 is a cross-sectional view showing an example of the vehicle antenna device 1*f* of the present embodiment.

Further, since a perspective view of the vehicle antenna device 1*f* of the present embodiment is the same as that of the first embodiment shown in FIG. 1 described above, description thereof will be omitted here. Also, in FIG. 15, since a configuration of an antenna cover 22 is the same as that of the first and fourth embodiments shown in FIGS. 2 and 12, illustration thereof will be omitted here.

As shown in FIG. 15, the vehicle antenna device 1*f* includes a vehicle glass 10*f*, an amplifier 30, and a high pass filter 40.

The vehicle glass 10*f* is, for example, a laminated glass. The vehicle glass 10*f* includes two glass substrates 11 (11-1 and 11-2), an antenna conductor 12, the conductive film 13*a* and the conductive film 13*c*, an intermediate film 14, an antenna electrode 15, and a feeding point 16. Also, as in the fourth embodiment shown in FIG. 12, a choke coil 50 is connected to the conductive film 13*a*, which is a light control film, to prevent leakage of a received signal of AM broadcast band.

Further, in FIG. 15, components the same as those in the first and fourth embodiments shown in FIGS. 2 and 12 will be denoted by the same reference signs, and description thereof will be omitted.

The conductive film 13*c* is, for example, a conductive film for low emissivity (Low-E coat). The conductive film 13*c* is disposed in contact with a fourth main surface F4 of the glass substrate 11-2. Further, in a case in which the Low-E coat is provided on the fourth main surface F4, it is preferable for the Low-E coat to be overcoated with an insulating layer such that it is not exposed on the surface. Also, the conductive film 13*c* has a third void area VA3 disposed to overlap a first void area VA1 in a plan view of the glass substrate 11-1. Further, in a plan view of the glass substrate 11-1, it is preferable that an outer edge of the first void area VA1 and an outer edge of the third void area VA3 coincide, although some deviation therebetween is allowable.

The feeding point 16 of the present embodiment is a part of the conductive film 13*c* and is electrically connected to the conductive film 13*c*. The vehicle antenna device 1*f* is capable of receiving AM broadcast band from the feeding point 16. The feeding point 16 is disposed at a center portion of the conductive film 13 at a distance of 150 mm or more from an end side of the glass substrate 11-2 in a plan view of the glass substrate 11-2.

Further, in the present embodiment, the conductive film 13*c*, which is a conductive film for low emissivity (Low-E coat), functions as an AM antenna and functions as an antenna ground for an antenna 21. A signal in a frequency band of AM broadcast band received by the conductive film 13*c*, which is a conductive film for low emissivity (Low-E coat), is input to an AM amplifier 31 of the amplifier 30 from the feeding point 16 (first feeding point). Also, a signal in a frequency band of FM broadcast band is input to an FM amplifier 32 of the amplifier 30 from the antenna electrode 15 (second feeding point).

As described above, in the present embodiment, the conductive film 13*a* (first conductive film) is sandwiched between the intermediate film 14-1 and the intermediate film 14-2. The conductive film 13*c* (second conductive film) is disposed in contact with the fourth main surface F4. The conductive film 13*a* is, for example, a light control film containing a conductor. The conductive film 13*c* is a conductor for a low emissivity film (Low-E coat).

Therefore, according to the vehicle antenna device 1*f* of the present embodiment, for example, even in a case in which both the light control film and the conductor for a low emissivity film (Low-E coat) are provided, AM broadcast band can easily be received.

Eighth Embodiment

Next, a vehicle antenna device 1*g* of an eighth embodiment will be described with reference to the drawings. In the present embodiment, a modified example in which a conductive film 13 and a signal electrode 16*b* are electrically connected by capacitive coupling will be described.

Figure 16:
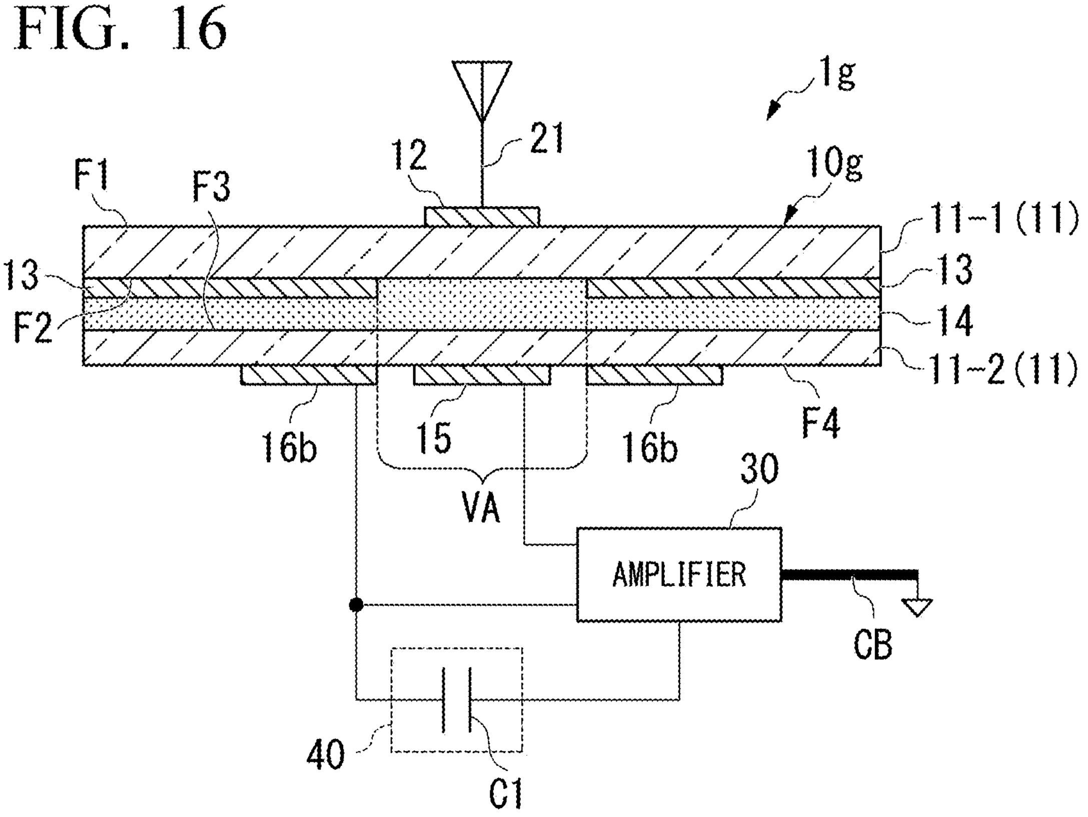
FIG. 16 is a cross-sectional view showing an example of a vehicle antenna device according to an eighth embodiment.

FIG. 16 is a cross-sectional view showing an example of the vehicle antenna device 1*g* of the present embodiment.

Further, since a perspective view of the vehicle antenna device 1*g* of the present embodiment is the same as that of the first embodiment shown in FIG. 1 described above, description thereof will be omitted here. Also, in FIG. 16, since a configuration of an antenna cover 22 is the same as that of the first embodiment shown in FIG. 2, illustration thereof will be omitted here.

As shown in FIG. 16, the vehicle antenna device 1*g* includes a vehicle glass 10*g*, an amplifier 30, and a high pass filter 40.

The vehicle glass 10*g* is, for example, a laminated glass. The vehicle glass 10*g* includes two glass substrates 11 (11-1 and 11-2), an antenna conductor 12, the conductive film 13, an intermediate film 14, an antenna electrode 15, and the signal electrode 16*b*. The present embodiment differs from the third embodiment described above in that the connection conductor 18*a* is not provided.

Further, in FIG. 16, components the same as those in the third embodiment shown in FIG. 11 will be denoted by the same reference signs, and description thereof will be omitted.

The signal electrode 16*b* is disposed to be electrically connected to the conductive film 13 by capacitive coupling. That is, the signal electrode 16*b* is disposed at a position overlapping the conductive film 13 in a plan view of the glass substrate 11-2 (11).

Also, the signal electrode 16*b* is formed in a square loop shape in a plan view of the glass substrate 11-2 (11). That is, an outer edge and an inner edge of the signal electrode 16*b* have a square shape.

Further, in the present embodiment, the conductive film 13 functions as an AM antenna and functions as an antenna ground for an antenna 21. A signal in a frequency band of AM broadcast band received by the conductive film 13 is electrically connected to the signal electrode 16*b* (first feeding point) by capacitive coupling and is input to an AM amplifier 31 of the amplifier 30 from a feeding point 16 (first feeding point). Also, a signal in a frequency band of FM broadcast band is input to an FM amplifier 32 of the amplifier 30 from the antenna electrode 15 (second feeding point).

As described above, in the present embodiment, the conductive film 13 and the signal electrode 16*b* are configured to be electrically connected by capacitive coupling. Therefore, the vehicle antenna device 1*g* of the present embodiment can take out the received signal of AM broadcast band from the signal electrode 16*b* (first feeding point) without performing drilling processing on the glass substrate 11-2 (11) and can receive the AM broadcast band more simply using the conductive film 13.

Further, the invention is not limited to the above-described embodiments and can be modified within a range not departing from the spirit of the invention.

For example, in each of the above-described embodiments, an example in which the antenna portion 20 is a shark fin antenna has been described, but the invention is not limited thereto, and may be, for example, a rod antenna.

Also, in each of the above-described embodiments, an example in which a dielectric substrate is used for the glass substrate 11 has been described, but the invention is not limited thereto, and may be a substrate using another dielectric such as, for example, a plastic substrate (resin substrate).

Also, in the third to eighth embodiments described above, an example in which the vehicle glasses 10*b* to 10*g* do not include the shielding layer 17 has been described, but the shielding layer 17 may be provided in the third to eighth embodiments.

Also, in the first and second embodiments described above, an example in which the vehicle glass 10 (10*a*) includes the shielding layer 17 has been described, but the shielding layer 17 may not be provided in the first and second embodiments.

Also, in each of the embodiments described above, an example in which the capacitor C1 of the high pass filter 40 is formed of a capacitor element has been described, but the capacitor C1 may be formed by capacitive coupling using, for example, the glass substrate 11 or the like between the conductive film 13 (13*a*, 13*b*) and the ground line (vehicle body BD). Also, the capacitor C1 may be formed by utilizing an overlap between the conductive film 13 (13*a*, 13*b*) and the vehicle body BD. Also, the filter 40 may be configured as a band stop filter.

Also, in the vehicle antenna device 1*e* of the sixth embodiment shown in FIG. 14, a third conductive film (not shown in the drawings) in contact with the fourth main surface F4 of the glass substrate 11-2 may be provided. In this case, the third conductive film in contact with the fourth main surface F4 may be disposed not to be in contact with the antenna electrode 15.

As described above, in a case in which the vehicle antenna device 1*e* has the third conductive film in contact with the fourth main surface F4, a combination in which the conductive film 13 serving as the first conductive film is a heat ray reflective film, the conductive film 13*a* serving as the second conductive film is a light control film (a conductor included therein), and the third conductive film is a Low-E coat may be exemplified.

Further, in a case in which the fourth main surface F4 has a Low-E coat, it is preferable for the Low-E coat to be overcoated with an insulating layer such that it is not exposed on the surface. Further, in a case in which the fourth main surface F4 has a Low-E coat, the connection conductor 18*a* may be omitted in FIG. 14. Further, the feeding point 16 may be provided as a part of the Low-E coat serving as the third conductive film (as shown in FIG. 15).

Further, in the vehicle antenna device 1*b* of the third embodiment shown in FIG. 11 to the vehicle antenna device 1*e* of the sixth embodiment shown in FIG. 14, the antenna conductor 12 and the antenna electrode 15 may be directly connected by the connection conductor 18 (connection conductor as shown in the second embodiment) disposed in the through hole of the glass substrate 11. Therefore, according to the vehicle antenna devices 1*b* to 1*e*, a sufficient antenna gain of the antenna 21 can be obtained with minimal mechanical processing of the glass substrate 11 as in the first embodiment.

What is claimed is:

1. A vehicle antenna device comprising:
 - a dielectric substrate having a first main surface and a second main surface; and
 - a conductive film provided on a side of the second main surface and having an area of 0.025 $m^2$ or more in a plan view of the dielectric substrate, the conductive film functioning as an AM antenna, wherein
 - the conductive film has a sheet resistance value of $1.5\times10^3\Omega/\square$ or lower,
 - AM broadcast band are receivable from a feeding point electrically connected to the conductive film,
 - the feeding point electrically connected to the conductive film is a first feeding point,
   - the vehicle antenna device includes:
     - an antenna provided on a side of the first main surface and receiving radio waves of at least one of frequencies of a VHF band and a UHF band;
     - an antenna electrode disposed inside an outer edge of a void area provided inside the conductive film in a plan view of the dielectric substrate;
     - an antenna conductor connected to the antenna and disposed on the side of the first main surface; and
     - a filter allowing a signal in a frequency band of radio waves of at least one of frequencies of the VHF band and the UHF band to pass and blocking a signal in a frequency band of AM broadcast band between the conductive film and a ground conductor, wherein
   - the antenna conductor is electrically connected to the antenna electrode, and
   - radio waves of at least one of frequencies of the VHF band and the UHF band are receivable by a signal received using the antenna electrode as a second feeding point.

2. The vehicle antenna device according to claim 1, wherein
 - the feeding point is disposed at a center portion of the conductive film at a distance of 150 mm or more from an end side of the dielectric substrate in a plan view of the dielectric substrate.

3. The vehicle antenna device according to claim 1, wherein
 - an outer edge of the conductive film is substantially quadrangular in a plan view of the dielectric substrate.

4. The vehicle antenna device according to claim 1, wherein
 - the antenna conductor and the antenna electrode are electrically connected by capacitive coupling.

5. The vehicle antenna device according to claim 1, wherein
 - the antenna conductor and the antenna electrode are directly connected by a connection conductor disposed in a through hole of the dielectric substrate.

6. The vehicle antenna device according to claim 1, wherein
 - the dielectric substrate is a first dielectric substrate,
 - the vehicle antenna device includes:
   - a second dielectric substrate disposed on the side of the second main surface of the first dielectric substrate parallel to the second main surface; and
   - an intermediate film disposed between the first dielectric substrate and the second dielectric substrate, wherein the second dielectric substrate includes a third main surface on a side of the first dielectric substrate and a fourth main surface on a side opposite to a side of the third main surface, the conductive film is disposed between the first dielectric substrate and the second dielectric substrate, and the antenna electrode is disposed on a side of the fourth main surface.

7. The vehicle antenna device according to claim 6, wherein the conductive film is disposed in contact with the second main surface.

8. The vehicle antenna device according to claim 6, wherein the intermediate film includes a first intermediate film and a second intermediate film, and the conductive film is sandwiched between the first intermediate film and the second intermediate film.

9. The vehicle antenna device according to claim 8, wherein the conductive film is a light control film containing a conductor.

10. The vehicle antenna device according to claim 6, wherein the conductive film is disposed in contact with the third main surface or the fourth main surface.

11. The vehicle antenna device according to claim 6, wherein the intermediate film includes a first intermediate film and a second intermediate film, the conductive film includes a first conductive film and a second conductive film, the first conductive film and the second conductive film are disposed at two positions among a position on the second main surface, a position between the first intermediate film and the second intermediate film, a position on the third main surface, and a position on the fourth main surface, and are disposed in order from a side close to the first dielectric substrate, and the second conductive film has a second void area disposed to overlap a first void area which is the void area of the first conductive film in a plan view of the first dielectric substrate.

12. The vehicle antenna device according to claim 11, wherein the first conductive film is disposed in contact with the second main surface, and the second conductive film is sandwiched between the first intermediate film and the second intermediate film.

13. The vehicle antenna device according to claim 12, wherein the first conductive film is a conductor for heat ray reflection, and the second conductive film is a light control film containing a conductor.

14. The vehicle antenna device according to claim 13, wherein the conductive film includes a third conductive film disposed in contact with the fourth main surface, and the third conductive film is a conductor for a low emissivity film.

15. The vehicle antenna device according to claim 14, wherein the first conductive film is a light control film containing a conductor, and the second conductive film is a conductor for a low emissivity film.

16. The vehicle antenna device according to claim 11, wherein the first conductive film is sandwiched between the first intermediate film and the second intermediate film, and the second conductive film is disposed in contact with the fourth main surface.

17. The vehicle antenna device according to claim 1, wherein the antenna is capable of receiving a frequency of FM broadcast band, the vehicle antenna device including an AM amplifier and an FM amplifier, a signal in a frequency band of AM broadcast band is input to the AM amplifier from the first feeding point, and a signal in a frequency band of FM broadcast band is input to the FM amplifier from the second feeding point.

18. The vehicle antenna device according to claim 1, wherein the filter is a capacitor, and a capacitance of the capacitor is 5 pF to 150 pF.

19. The vehicle antenna device according to claim 1, wherein the antenna is disposed to be surrounded by a cover member protruding outward from the side of the first main surface of the dielectric substrate.

* * * * *